United States Patent
Tidhar et al.

(10) Patent No.: US 9,639,508 B2
(45) Date of Patent: May 2, 2017

(54) SYSTEMS AND METHODS FOR PROVIDING A CONTEXTUAL USER INTERFACE ELEMENT

(71) Applicant: WORLDMATE, LTD., Lod (IL)

(72) Inventors: Alon Tidhar, Rehovot (IL); Eilon Carmi, Tikwa (IL)

(73) Assignee: WORLDMATE, LTD., Lod (IL)

( * ) Notice: Subject to any disclaimer, the term of this patent is extended or adjusted under 35 U.S.C. 154(b) by 836 days.

(21) Appl. No.: 13/918,843

(22) Filed: Jun. 14, 2013

(65) Prior Publication Data

US 2014/0372867 A1    Dec. 18, 2014

(51) Int. Cl.
G06F 17/00 (2006.01)
G06F 17/22 (2006.01)
G06F 17/24 (2006.01)

(52) U.S. Cl.
CPC ........ G06F 17/2247 (2013.01); G06F 17/243 (2013.01)

(58) Field of Classification Search
CPC .. G06F 17/243; G06F 17/25; G06F 17/30899; G06F 17/2247
See application file for complete search history.

(56) References Cited

U.S. PATENT DOCUMENTS

| | | | |
|---|---|---|---|
| 6,633,310 B1* | 10/2003 | Andrew | G06F 3/0481 715/728 |
| 7,769,610 B2 | 8/2010 | Liew et al. | |
| 7,899,692 B2 | 3/2011 | Caballero et al. | |
| 8,150,767 B2 | 4/2012 | Wankmueller | |
| 8,209,200 B2 | 6/2012 | Sokel et al. | |
| 8,296,281 B2 | 10/2012 | Baker et al. | |
| 8,306,835 B2 | 11/2012 | de Marcken et al. | |
| 8,396,728 B2 | 3/2013 | Boruff et al. | |
| 2004/0240408 A1* | 12/2004 | Gur | G06F 8/61 370/328 |
| 2007/0136313 A1* | 6/2007 | Dutta | G06F 9/4443 |
| 2007/0219832 A1 | 9/2007 | Willacy | |
| 2008/0010298 A1 | 1/2008 | Steele et al. | |
| 2008/0066020 A1* | 3/2008 | Boss | G06F 17/243 715/780 |
| 2010/0228577 A1* | 9/2010 | Cunningham | G06Q 10/10 705/5 |

(Continued)

*Primary Examiner* — Scott Baderman
*Assistant Examiner* — Howard Cortes
(74) *Attorney, Agent, or Firm* — Foley & Lardner LLP

(57) ABSTRACT

Systems and methods for providing a contextual user interface element are provided. A described system includes a user device configured to receive, from a remote server, itinerary-specific data relating to a particular travel itinerary and information for accessing a travel website for performing a travel-related action. The user device is configured to present the itinerary-specific data in a contextual user interface element on the user device concurrently with a web page of the travel website for performing the travel-related action. The itinerary-specific data are presented as selectable data elements within the contextual user interface element. The user device is configured to receive a user selection of a selectable data element and to execute instructions for copying the itinerary-specific data from the contextual user interface element to a form field of the travel website in response to the user selection.

25 Claims, 19 Drawing Sheets

(56) References Cited

U.S. PATENT DOCUMENTS

| | | | |
|---|---|---|---|
| 2012/0042024 A1* | 2/2012 | Kirshenboim | H04L 51/18 709/206 |
| 2012/0265690 A1 | 10/2012 | Bishop et al. | |
| 2012/0271676 A1 | 10/2012 | Aravamudan et al. | |
| 2012/0290201 A1 | 11/2012 | McReaken et al. | |
| 2013/0030847 A1 | 1/2013 | Fitzgerald et al. | |
| 2013/0212496 A1* | 8/2013 | Antebi | G06F 17/30893 715/760 |
| 2014/0258828 A1* | 9/2014 | Lymer | G06F 17/243 715/224 |
| 2014/0258889 A1* | 9/2014 | Badge | G06F 17/30873 715/760 |
| 2014/0270400 A1* | 9/2014 | Natale | G06Q 10/02 382/115 |
| 2015/0121240 A1* | 4/2015 | Boonstoppel | H04L 67/36 715/739 |

\* cited by examiner

SYSTEMS AND METHODS FOR PROVIDING A CONTEXTUAL USER INTERFACE ELEMENT

BACKGROUND

The present description relates generally to systems and methods for managing travel arrangements on a mobile device. More specifically, the present description relates to systems and methods for automatically navigating a website operated by a travel provider and for facilitating interactions between such travel websites and a mobile device.

Many travel providers operate websites through which users can create and manage travel arrangements. For example, a user may visit websites operated by airlines, hotels, or car rental services to purchase airline tickets, check-in to a flight or hotel, cancel or change reservations, or perform other travel-related actions. Although many travel websites require the same or similar information from a user for performing such travel-related actions, the structure and user interface for various travel websites are often significantly different. It can be challenging and time consuming for a user to learn and navigate many different user interfaces presented by different travel websites.

Additionally, using a travel website to perform travel-related actions (e.g., checking into a flight or hotel) typically requires a user to manually enter information relating to a particular user and a particular travel arrangement. For example, a user may be required to login to a user account and enter a confirmation number before being able to confirm a reservation or check-in for a flight. It is challenging and difficult to automate such travel-related actions due to the differences between travel providers' websites and the user-specific and arrangement-specific information required.

SUMMARY

One implementation of the present disclosure is a system for facilitating interactions between a travel website and a user device. The system includes a user device configured to receive, from a remote server, itinerary-specific data relating to a particular travel itinerary and information for accessing a travel website for performing a travel-related action. The user device is configured to present the itinerary-specific data in a contextual user interface element on the user device concurrently with a web page of the travel website for performing the travel-related action. The itinerary-specific data are presented as selectable data elements within the contextual user interface element. The user device is configured to receive a user selection of a selectable data element and to execute instructions for copying the itinerary-specific data from the contextual user interface element to a form field of the travel website in response to the user selection.

In some embodiments, the user device is configured to receive a user input requesting performance of a travel-related action by the user device and to send a request for instructions for performing the travel-related action to a remote server, the request including an indication of a particular travel itinerary.

In some embodiments, the user device is configured to receive instructions for presenting the itinerary-specific data in the contextual user interface element from the remote server. The itinerary-specific data may be presented in the contextual user interface element according to the instructions received from the remote server.

In some embodiments, the user device is a mobile device is configured to present the webpage of the travel website using a web browser embedded in an application running on the user device. The application may be configured to generate the contextual user interface element and present the contextual user interface element concurrently with the webpage of the travel website. In some embodiments, the application is a mobile application running on the mobile device.

In some embodiments, the user device is configured to determine which of a plurality of itinerary-specific data elements to present in the contextual user interface element based on content of the web page presented concurrently with the contextual user interface element.

In some embodiments, the user device is configured to load a first webpage of the travel website in a web browser running on the user device, present a subset of the itinerary-specific data in the contextual user interface element concurrently with the first webpage, navigate from the first webpage of the travel website to a second webpage of the travel website using the web browser, adjust the subset of itinerary-specific data elements presented in the contextual user interface element in response to navigating from the first webpage to the second webpage, and present the adjusted subset of itinerary-specific data elements in the contextual user interface element concurrently with the second webpage.

In some embodiments, the user device is further configured to select one or more of a plurality of itinerary-specific data elements for inclusion in the subset of itinerary-specific data presented concurrently with the first webpage based on content of the first webpage, and select one or more of the plurality of itinerary-specific data elements for inclusion in the adjusted subset of itinerary-specific data presented concurrently with the second webpage based on content of the second webpage.

In some embodiments, the system further includes a remote server configured to generate instructions for presenting the itinerary-specific data in the contextual user interface element and provide the instructions to the user device. The itinerary-specific data may be presented in the contextual user interface element by the user device according to the instructions received from the remote server.

In some embodiments, the instructions for presenting the itinerary-specific data in the contextual user interface element on the user device include instructions for determining which of a plurality of itinerary-specific data elements to present in the contextual user interface element. In some embodiments, the instructions are JavaScript® instructions.

Another implementation of the present disclosure is a method for facilitating interactions between a travel website and a user device. The method includes initiating, at a remote server, synchronization of itinerary-specific data and instructions for performing a travel-related action with a user device. The method further includes retrieving itinerary-specific data relating to the particular travel itinerary from an itinerary database and identifying, by the remote server, information for accessing a travel website for performing the travel-related action. The method further includes generating, by the remote server, instructions for presenting the itinerary-specific data in a contextual user interface element on the user device. The instructions may include instructions for presenting the contextual user interface element concurrently with a webpage of the travel website for performing the travel-related action. The method further includes providing the itinerary-specific data, the information for accessing the travel website, and the instructions for presenting the itinerary-specific data in the contextual user interface element to the user device.

In some embodiments, the instructions for presenting the itinerary-specific data in the contextual user interface element on the user device include instructions for copying the itinerary-specific data from the contextual user interface element to a form field of the travel website.

In some embodiments, the instructions for presenting the itinerary-specific data in the contextual user interface element on the user device include instructions for presenting the itinerary-specific data as selectable data elements in the contextual user interface element. The instructions for presenting the itinerary-specific data in the contextual user interface element may further include instructions for copying the itinerary-specific data from the contextual user interface element to a form field of the travel website in response to a user selection of a selectable data element.

In some embodiments, the instructions for presenting the itinerary-specific data in the contextual user interface element on the user device include instructions for determining which of a plurality of itinerary-specific data elements to present in the contextual user interface element.

In some embodiments, the instructions for determining which of the plurality of itinerary-specific data elements to present in the contextual user interface element include logic for determining which of the plurality of itinerary-specific data elements to present in the contextual user interface element based on content of the one or more concurrently-presented web pages of the travel website. In some embodiments, the instructions are JavaScript® instructions.

Another implementation of the present disclosure is a method for facilitating interactions between a travel website and a user device. The method includes receiving, at a user device, itinerary-specific data relating to a particular travel itinerary, information for accessing a travel website for performing the travel-related action, and instructions for presenting the itinerary-specific data in a contextual user interface element. The method further includes receiving, via a user interface element of the user device, an input requesting performance of a travel-related action by the user device. The method further includes presenting the itinerary-specific data in a contextual user interface element on the user device. The contextual user interface element may be presented concurrently with a webpage of the travel website for performing the travel-related action.

In some embodiments, the method further includes loading a webpage of the travel website for performing the travel-related action in a web browser running on the user device and copying the itinerary-specific data from the contextual user interface element to a form field of the travel website for performing the travel-related action.

In some embodiments, the itinerary-specific data are presented as selectable data elements within the contextual user interface element and the method further includes receiving a user selection of a selectable data element. The itinerary-specific data may be copied from the contextual user interface element to a form field of the travel website in response to the user selection.

In some embodiments, the itinerary-specific data are presented as movable icons within the contextual user interface element and the method further includes receiving a user input moving a movable icon into a space occupied by a form field of the travel website. The itinerary-specific data may be copied from the contextual user interface element to the form field of the travel website in response to the user input.

In some embodiments, the contextual user interface element is presented as a variable-transparency user interface element and the itinerary-specific data are presented as movable icons within the variable-transparency user interface element. The method may further include adjusting a transparency of the contextual user interface element in response to a user input moving a movable icon out of the contextual user interface element.

In some embodiments, the method further includes determining which of a plurality of itinerary-specific data elements to present in the contextual user interface element based on content of the webpage presented concurrently with the contextual user interface element.

In some embodiments, the method further includes loading a first webpage of the travel website for performing the travel-related action in a web browser running on the user device, presenting a subset of the itinerary-specific data in the contextual user interface element concurrently with the first webpage, navigating from the first webpage of the travel website to a second webpage of the travel website, adjusting the subset of itinerary-specific data elements presented in the contextual user interface element in response to navigating from the first webpage to the second webpage, and presenting the adjusted subset of itinerary-specific data elements in the contextual user interface element concurrently with the second webpage.

In some embodiments, the method further includes selecting one or more of a plurality of itinerary-specific data elements for inclusion in the subset of itinerary-specific data presented concurrently with the first webpage based on content of the first webpage and selecting one or more of the plurality of itinerary-specific data elements for inclusion in the adjusted subset of itinerary-specific data presented concurrently with the second webpage based on content of the second webpage.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for facilitating interactions between a travel website and a user device are shown, according to several exemplary embodiments. The systems and methods described herein may be used to automate or partially automate various travel-related actions which can be performed through a travel website (e.g., a website operated by a travel provider such as an airline, a hotel, a car rental service, etc.). For example, the described systems and methods can be used to facilitate online check-in for a flight or a hotel, to confirm or change existing travel arrangements, to create new travel arrangements, and/or to perform other travel-related actions which can be accomplished through a travel website.

Although many travel websites require the same or similar types of information from a user for performing travel-related actions (e.g., user name, confirmation number, phone number, etc.), the particular information may be different for different websites. For example, a username and password for logging in to the American Airlines website may be different than a username and password for logging in to the United Airlines website for the same user. Additionally, the steps required to navigate the American Airlines website and the United Airlines website may be significantly different. It can be challenging and time consuming for a user to learn and navigate many different travel websites. Also, it can be difficult for a user to remember or retrieve itinerary-specific information (e.g., reservation number, confirmation number, flight departure time, etc.) relating to particular travel arrangements.

Advantageously, the systems and methods described herein may provide a user-friendly interface for interacting with many different travel websites via a single user application. The described systems and methods may facilitate automatic navigation through many different travel websites to direct a user to the exact webpage required to perform the desired travel-related action. Additionally, the described systems and methods can automatically provide itinerary-specific data to the travel website (e.g., by automatically filling form fields presented on the travel website, by presenting a user interface element containing itinerary-specific data, etc.), thereby eliminating the requirement for a user to remember or retrieve such information (e.g., from a confirmation email, etc.). Thus, the systems and methods of the present application may advantageously allow a user to quickly open an application and check-in to a flight without searching through emails for the information needed to manually login to the travel provider's website or complete the check-in process.

Figure 1:
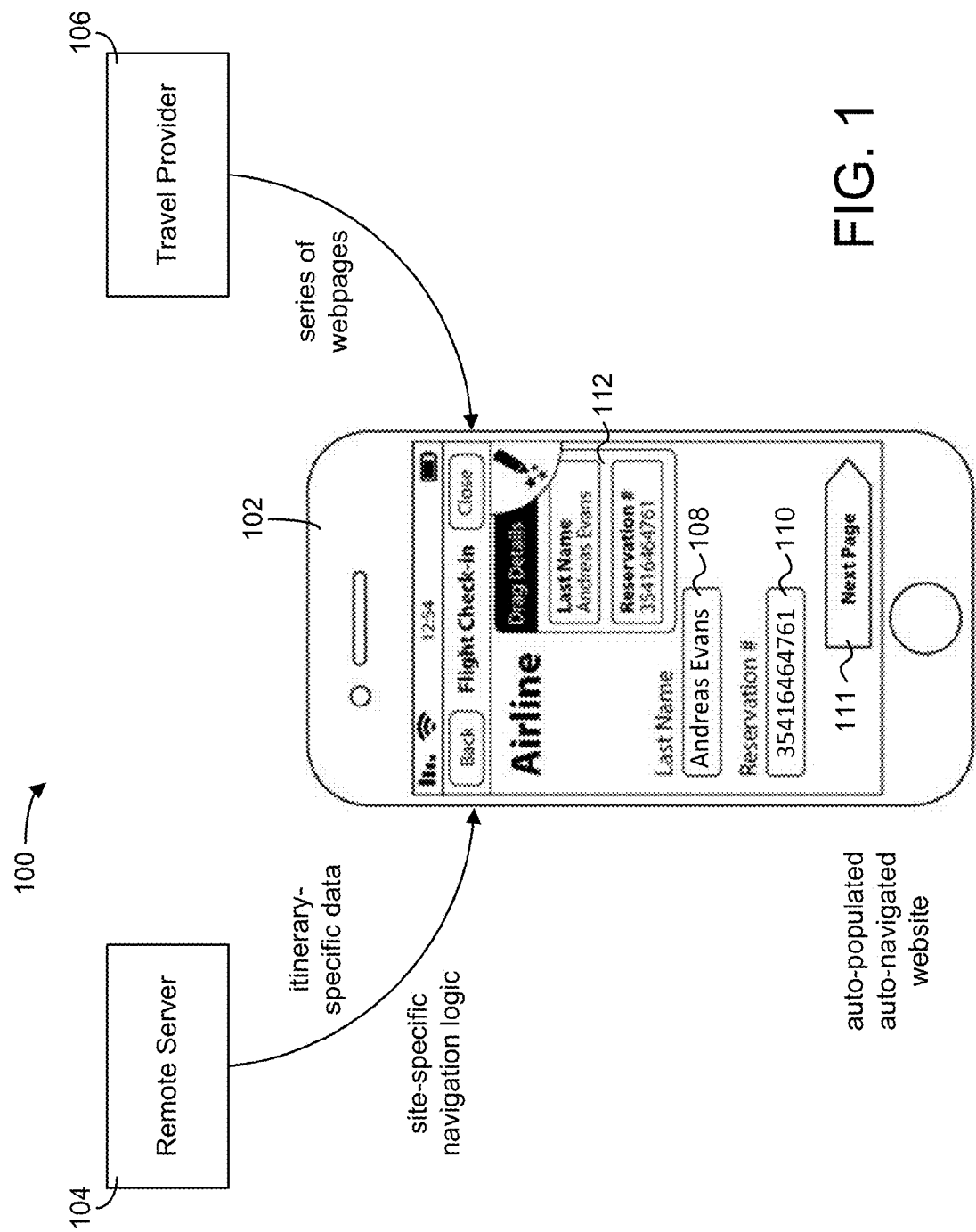
FIG. 1 is a drawing illustrating, in brief overview, a system for facilitating interactions between a user device and a travel website, according to an exemplary embodiment.

Referring now to FIG. 1, a drawing of a system 100 for facilitating interactions between a travel website and a user device is shown, according to an exemplary embodiment. System 100 illustrates, in brief overview, several features and advantages provided by the systems and methods of the present disclosure. System 100 is shown to include a user device 102, a remote server 104, and a travel provider 106. In some embodiments, user device 102 is a mobile computing device such as a smartphone, a laptop computer, a tablet computer, or other portable computing device. User device 102 is configured to run a mobile application. The mobile application is configured to interact with remote server 104 and travel provider 106 for performing various travel-related actions. In some embodiments, the mobile application includes an embedded web browser for rendering and/or presenting travel website data from travel provider 106.

Remote server 104 manages and stores itinerary-specific data and site-specific navigation information. Itinerary-specific data includes information relating to a particular user and/or a particular travel arrangement (e.g., flight number, reservation number, departure time, departure location, passenger name, etc.). Site-specific navigation information includes information describing a sequence of actions or web pages required to perform a particular travel-related action for a particular travel website.

Travel provider 106 may be a provider of any travel-related service. For example, travel provider 106 may be an airline, a railroad, a water travel provider, a bussing provider, a hotel organization, a car rental service, or any other travel-related service provider. In alternate embodiments, travel provider 106 may be a travel agency or another travel-related service provider. Travel provider 106 may operate a website through which users can perform travel-related actions. For example, travel-related actions may include checking-in for a flight or a hotel, confirming or changing existing travel arrangements, canceling travel arrangements, creating new travel arrangements, or other types of interactions between a user and a travel provider 106.

The website operated by travel provider 106 may include a series of individual web pages. For example, a particular travel website may require a user to login at a first webpage, enter a confirmation number at a second webpage, and finally click a confirmation button at a third web page. Ordinarily, a user would be required to manually navigate the series of web page and manually enter information into each of the individual web pages.

Still referring to FIG. 1, user device 102 is shown receiving itinerary-specific data and site-specific navigation logic from remote server 104. In some embodiments, the itinerary-specific data and/or the site-specific navigation logic may be received from remote server 104 as executable instructions. User device 102 is also shown receiving a series of web pages (e.g., travel website data) from travel provider 106. Advantageously, user device 102 can combine the series of web pages with the site-specific navigation logic and itinerary-specific data to create a modified version of the travel website which can be automatically navigated and automatically populated by user device 102.

User device 102 can automatically navigate the series of web pages received from travel provider 106 (e.g., according to the site-specific navigation logic) and automatically enter any required information to the series of web pages (e.g., according to the itinerary-specific data) to automatically complete the travel-related action. For example, user device 102 is shown displaying a web page having a "Last Name" form field 108, a "Reservation #" form field 110, and a "Next Page" button 111. The executable instructions may cause user device 102 to populate form fields 108-110 with the itinerary-specific data received from remote server 104 and automatically select "Next Page" button 111 when all of the required information has been entered.

User device 102 may be configured to present a contextual user interface element 112 for displaying one or more of the itinerary-specific data received from remote server 104. Contextual user interface element 112 may be configured to present the itinerary-specific data as selectable data elements and/or movable icons. A user can drag an icon out of contextual user interface element 112 and drop the icon into a form field of the travel website to insert/copy the value of the data element associated with the icon into the form field. Alternatively, a user can click in a form field and then click an icon to apply the value of the data element associated with the icon into the form field. This semi-automated form-filling (e.g., by dragging and dropping or clicking) may advantageously eliminate the need for users to manually enter the itinerary-specific information into the travel website.

Contextual user interface element 112 may be presented concurrently with one or more of the series of web pages received from travel provider 106. In some embodiments, contextual user interface element 112 may be configured to display icons or data elements relevant to a particular web page. For example, the application running on user device 102 may be configured to determine which of a plurality of itinerary specific data elements to include within contextual user interface element 112 based on the content of the webpage with which contextual user interface element 112 is concurrently displayed. This feature may allow contextual user interface element 112 to be adjusted (e.g., by adding or removing data elements) as user device 102 navigates through the series of web pages to ensure that a user is provided with the information needed to complete any required form fields of the travel website.

Advantageously, user device 102 may run a single application configured to access, automatically navigate, and automatically provide itinerary-specific data to many different travel websites. The application may be a third-party application configured to access a standard mobile or non-mobile version of the travel providers' websites using a web browser embedded within the application. The application may not be affiliated with any particular travel provider and may be capable of interacting with the websites of many different travel providers.

Figure 2:
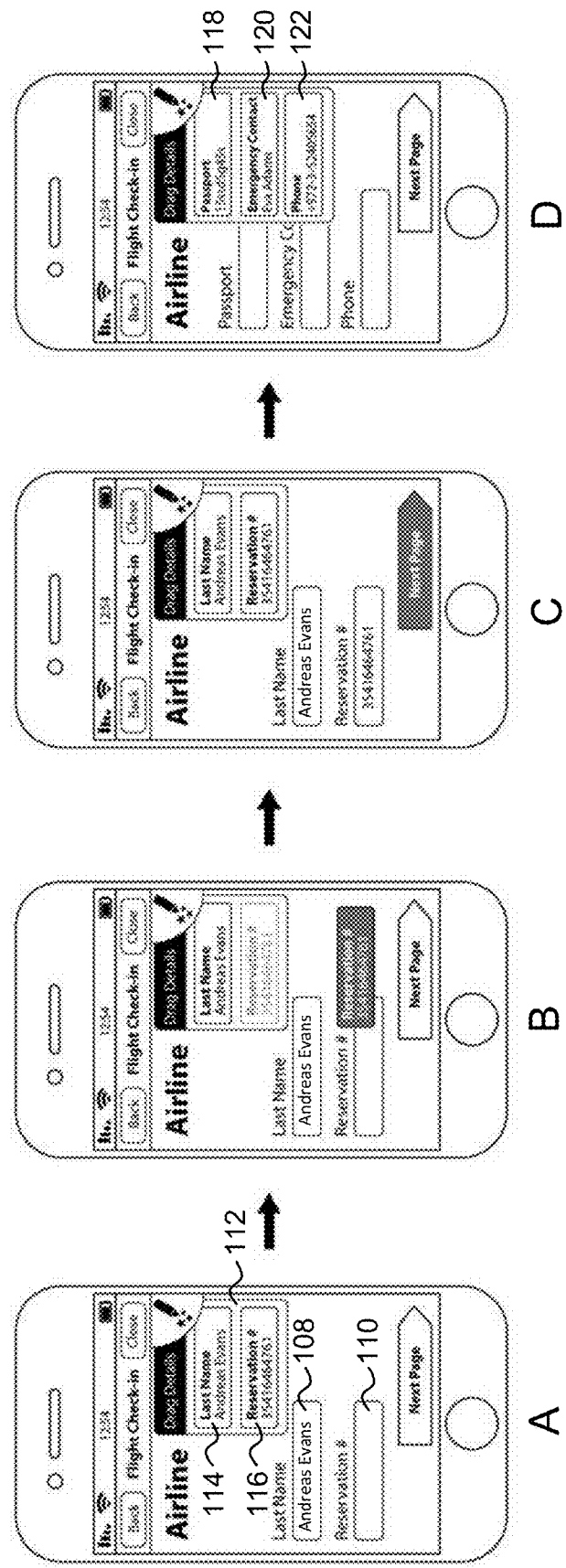
FIG. 2 is a drawing of a contextual user interface element which may be presented by the user device and used to automatically fill form fields with itinerary-specific data without requiring a user to manually enter the data, according to an exemplary embodiment.

Referring now to FIG. 2, user device 102 may be configured to present a contextual user interface element 112. Contextual user interface element 112 may include one or more of the itinerary-specific data received from remote server 104. For example, referring specifically to FIG. 2A, contextual user interface element 112 is shown displaying a "Last Name" data element 114 and a "Reservation #" data element 116. In some embodiments, data elements displayed in contextual user interface element 112 include an indication of the type of data element (e.g., data element name, description, title, etc.) and a value of the data element. For example, the value of "Last Name" data element 114 is shown as "Andreas Evens" and the value of the "Reservation #" data element 116 is shown as "34516464761."

In some embodiments, one or more of form fields 108-110 may be automatically populated with data element values according to the executable instructions received from remote server 104. For example, "Last Name" form field 108 is shown pre-populated with the value of "Last Name" data element 114. However, in some instances, not all form fields can be populated automatically. For example, some travel websites may be unsupported or may have recently changed in a way that temporarily prevents automatic population (e.g., changed form field names, updated website design, etc.). Contextual user interface element 112 can be used to display itinerary-specific data in a format that can be easily applied to form fields in the travel website when automatic population is unavailable.

Referring specifically to FIGS. 2B-2C, data elements in contextual user interface element 112 may be dragged into form fields in the travel web site to automatically apply the value of the data elements to the form field. For example, "Reservation #" data element 116 can be dragged into form field 110 (shown in FIG. 2B) to apply the value of data element 116 (e.g., "34516464761") to form field 110 (shown in FIG. 2C). Data element values may also be applied to form fields by clicking in the form field and clicking on the data element in contextual user interface element 112. Advantageously, contextual user interface element 112 facilitates semi-automatic form field population (e.g., by dragging and dropping, clicking, etc.) without requiring a user to manually enter the data value.

Referring specifically to FIGS. 2C-2D, in some embodiments, contextual user interface element 112 may be configured to display data elements relevant to a particular web page. User device 102 may determine which data elements are relevant to a particular web page based on the content of the web page data (e.g., HTML data, XML data, form field names, etc.). User device 102 may add, remove, re-organize, or otherwise adjust the data elements presented in contextual user interface element 112 based on the context provided by the web page data.

As user device 102 navigates from page to page (e.g., automatically or in response to a user input), the data elements displayed in contextual user interface element 112 may be adjusted. For example, as user device 102 navigates from the web page shown in FIG. 2C to the web page shown in FIG. 2D, data elements 114-116 may be replaced with data elements 118-122. Data elements 118-122 may be selected for display in contextual user interface element 112 based on the content of the web page shown in FIG. 2D. For example, FIG. 2D shows a web page having form fields labeled "Passport," "Emergency Contact," and "Phone." User device 102 may identify itinerary-specific data elements corresponding to the form fields in the web page and present the identified data elements in contextual user interface element 112. A user may apply the values of data elements 118-122 to the form fields by dragging and dropping or clicking, as previously described.

Figure 3A:
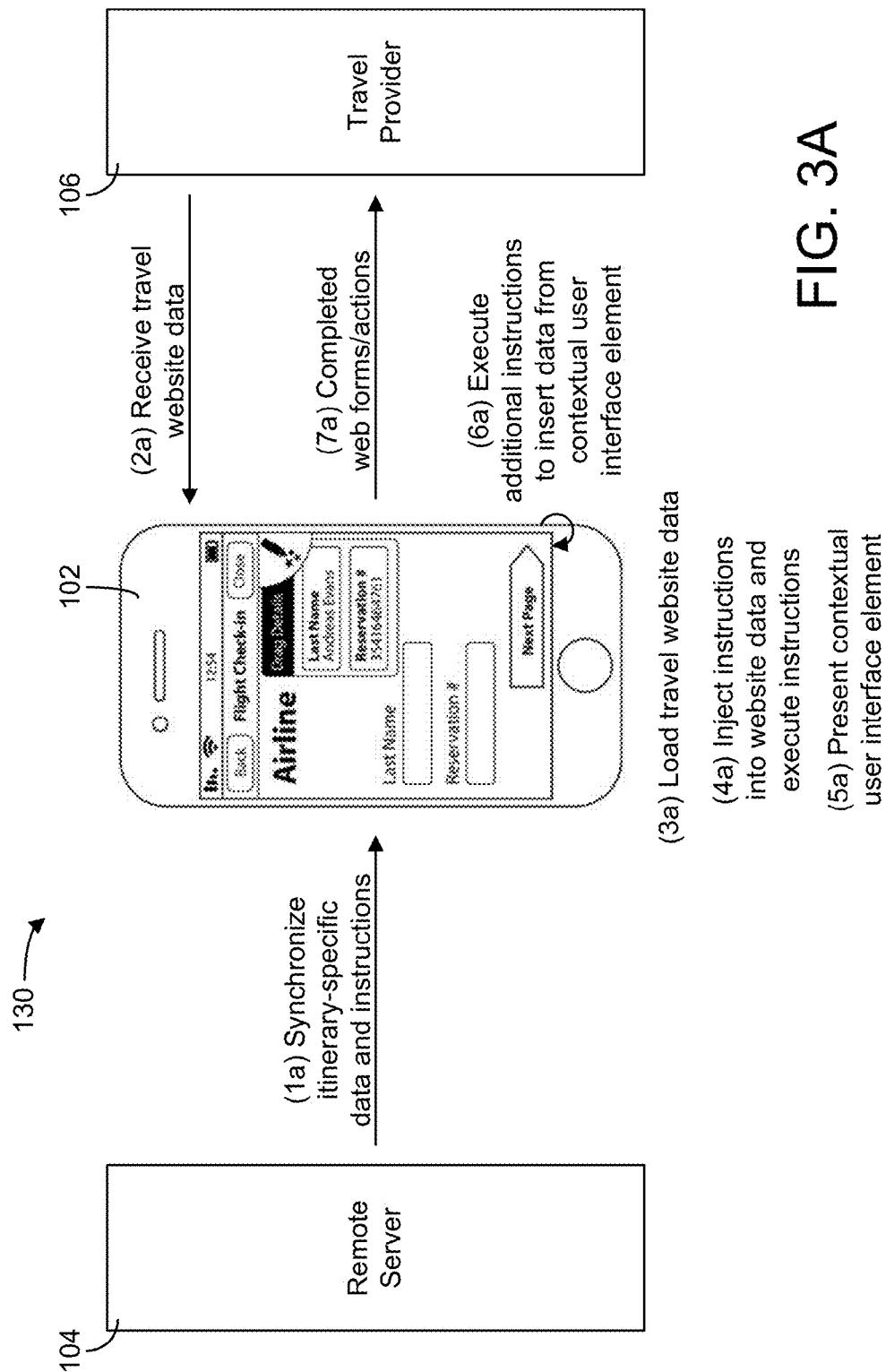
FIG. 3A is a system architecture diagram illustrating, in greater detail, the system of FIG. 1 and showing a series process steps which may be performed by a remote server and a user device for facilitating interactions between the user device and a travel website, according to an exemplary embodiment.

Referring now to FIG. 3A, a system architecture diagram 130 illustrating the components of system 100 in greater detail is shown, according to an exemplary embodiment. System architecture diagram 130 is shown to include user device 102, remote server 104, and travel provider 106.

User device 102 may be any type of user-operable electronic device. For example, user device 102 may be a desktop computer, laptop computer, smartphone, tablet computer, mobile communication device, remote workstation, client terminal, entertainment console, or any other device capable of interacting with the other components of system 100 (e.g., via a communications interface). In some embodiments, user device 102 is a mobile computing device (e.g., a laptop computer, a smartphone, etc.). In other embodiments, user device 102 is a non-mobile device (e.g., a desktop computer, a stationary client terminal, etc.).

User device 102 may be configured to run an application for interacting with remote server 104 and travel provider 106. In some embodiments, the application may be a mobile application (e.g., an application designed to be run by a mobile computing device). The application may be used to automate and/or facilitate performance of various travel-related actions. In some embodiments, the application includes an embedded web browser for rendering or presenting website data from travel provider 106.

Still referring to FIG. 3A, remote server 104 may manage itinerary-specific data relating to particular travel arrangements. For example, when a user purchases a flight ticket, information relating to the travel arrangement (e.g., flight number, reservation number, departure time, departure location, passenger name, etc.) may be provided to remote server 104. Remote server 104 may interact with travel provider 106 to retrieve detailed information relating to various travel arrangements and update the stored itinerary-specific data if any of the details change. The itinerary-specific data may include data relating to both a particular user and a particular travel arrangement. In some embodiments, the itinerary-specific data includes all the raw information necessary to perform a travel-related action.

Remote server 104 may also store site-specific navigation information for various travel websites. The site-specific navigation information may include information describing a sequence of actions required to perform a travel-related action for a particular travel website. For example, a particular travel website may require a user to login at a first webpage, enter a confirmation number at a second webpage, and finally click a confirmation icon at a third web page. The site-specific navigation information may provide navigation logic for performing a particular travel-related action at a particular travel website.

Still referring to FIG. 3A, travel provider 106 may be a provider of any travel-related service. For example, travel provider 106 may be an airline, a railroad, a water travel provider, a bussing provider, a hotel organization, a car rental service, or any other travel-related service provider. In alternate embodiments, travel provider 106 may be a travel agency or another travel-related service provider. Travel provider 106 may operate a website through which users can perform travel-related actions (i.e., a "travel website"). For example, travel-related actions may include checking-in for a flight or a hotel, confirming or changing existing travel arrangements, canceling travel arrangements, creating new travel arrangements, or other types of interactions between a user and a travel provider 106. In some embodiments, the travel website includes a series of individual web pages and may include one or more web forms requiring input from user device 102 for completing the travel-related action.

Still referring to FIG. 3A, system architecture diagram 130 is shown to include a series of interactions between user device 102, remote server 104, and travel provider 106. The series of interactions illustrates an exemplary process for facilitating performance of travel-related actions by user device 102.

The illustrated process is shown to include synchronizing itinerary-specific data and instructions (step 1a). In step 1a, user device 102 receives the most recent itinerary-specific data from remote server 104. In some embodiments, step 1a is performed each time itinerary-specific data is updated at remote server 104. The itinerary-specific data may include data relating to a particular travel itinerary or travel arrangement. For example, the itinerary-specific data may include a flight number, a reservation number, a confirmation number, a flight departure time, departure location, or any other information relating to a particular travel arrangement/itinerary.

In some embodiments, the itinerary-specific data includes data relating to both a particular user and a particular travel arrangement. Data relating to a particular user may include general user information which may be potentially relevant for more than one travel itinerary. For example, user-specific data may include the user's name, login information (e.g., for a particular travel website), passport information, phone number, emergency contact information, home address, or other information potentially relevant to a plurality of travel arrangements. In some embodiments, the itinerary-specific data includes all the raw information necessary to perform a travel-related action.

In step 1a, user device 102 also receives instructions for completing the travel-related action from remote server 104. The instructions for performing the travel-related action may include a URL of a travel webpage. The URL may be a URL of a particular webpage of a travel website for initiating the travel-related action.

The instructions for completing the travel-related action may further include instructions for navigating the travel website. The instructions for navigating the travel website may be site-specific instructions (e.g., specific to a particular travel website) and/or action-specific instructions (e.g., specific to a particular travel-related action). The instructions for navigating the travel website may include instructions for navigating from the provided URL of the travel webpage to the completion of the travel-related action. The instructions for navigating the travel website may include a series of web pages required to be loaded and/or a series of actions required to be performed by user device 102 to complete the travel-related action.

The instructions for completing the travel-related action may further include instructions for instructions for automatically providing the itinerary-specific data to the travel website. In some embodiments, the instructions for providing the itinerary-specific data to the travel website include instructions for automatically populating form fields of the travel website with the itinerary-specific information.

In some embodiments, the instructions for completing the travel-related action further include instructions for automatically providing user-specific data to the travel website or otherwise configuring the website for a particular user.

The instructions for automatically providing user-specific data to the travel website may include instructions for providing login information to the website. Instructions for configuring the website for a particular user may include instructions for setting language, locale, or other user preferences when the website is displayed. In some embodiments, the instructions for providing user-specific data to the travel website or otherwise configuring the website for a particular user may be included in the itinerary-specific instructions and/or the navigation instructions.

In some embodiments, the instructions for completing the travel-related action further include instructions for providing a contextual user interface element (e.g., contextual user interface element 112). The instructions for providing a contextual user interface element may include instructions for presenting particular itinerary-specific or user-specific data elements within contextual user interface element 112 when a particular webpage is loaded by user device 102. In some embodiments, the instructions for providing the contextual user interface element may include logic for determining whether a particular data element should be displayed. The instructions for providing the contextual user interface element may further include instructions for inserting a value of a data element into a form field in response to a user input received via user device 102 (e.g., dragging and dropping the data element into a space occupied by the form field, clicking the data element into the form field, etc.).

Still referring to FIG. 3A, the illustrated process is shown to further include receiving travel website data (step 2a). Step 2a may be performed by user device 102 by retrieving website data from travel provider 106. In some embodiments, step 2a may be performed by user device 102 in response to a user input received at user device 102 (e.g., a user input requesting performance of a travel-related action). In other embodiments, step 2a may be performed by user device 102 in response to receiving itinerary-specific data, instructions, a push notification, or any other input from remote server 104. The travel website data may include a series of web pages and one or more form fields requiring input from user device 102.

Still referring to FIG. 3A, the illustrated process is shown to include loading the travel website data (step 3a). Step 3a may be performed by user device 102 upon receiving the travel website data from travel provider 106. In some embodiments, step 3a is performed by a web browser embedded in the application running on user device 102. Loading the travel website data may include loading unmodified website data (e.g., a standard mobile or non-mobile version of the travel website).

The illustrated process is shown to further include injecting the instructions into the website data and executing the instructions (step 4a). Step 4a may be performed by user device 102 upon receiving both the travel website data from travel provider 106 and the instructions from remote server 104. In some embodiments, step 4a may be performed by an application (e.g., a mobile application) running on user device 102. In some embodiments, the instructions may be JavaScript® instructions and may be inserted into the existing website data as executable instructions. Injecting the instructions into the website data may create modified website data.

Executing the instructions may include performing actions according to the instructions. For example, executing the instructions may include automatically populating form fields in the travel website data with the itinerary-specific and/or user-specific data. In some embodiments, executing the instructions includes automatically navigating between pages of the travel website. In some embodiments, executing the instructions includes both automatically populating form fields and automatically navigating between pages of the travel website. For example, executing the instructions may cause user device 102 to navigate to a particular webpage, populate form fields of the webpage, and proceed to navigate to another webpage. By executing the instructions, user device 102 may automatically perform some or all of the operations required to complete the travel-related action.

Still referring to FIG. 3A, the illustrated process is shown to include presenting a contextual user interface element (step 5a). Step 5a may be performed by user device 102 in addition to or in place of step 4a. The contextual user interface element (e.g., element 112) may be an electronic "wallet" including one or more itinerary-specific or user-specific data elements which may be applied to form fields in the travel website data. In some embodiments, user device 102 selects particular data elements to include in contextual user interface element 112 based on the content of the webpage displayed (e.g., HTML content, XML content, metadata content, etc.). In other embodiments, user device 102 selects data elements to include in the contextual user interface element using the instructions for providing the contextual user interface element (e.g., received in step 1a).

The illustrated process is shown to further include executing additional instructions to insert data from the contextual user interface element (step 6a). Step 6a may be performed in response to a user input received via a user interface element of user device 102. For example, as described with reference to FIG. 2, a user may drag and drop data elements from the contextual user interface element into form fields of the travel website. Dropping a data element into a space occupied by a form field may cause user device 102 to execute additional instructions for automatically inserting the value of the data element into the form field.

Still referring to FIG. 3A, the illustrated process is shown to further include providing the completed web forms to travel provider 106 (step 7a). Step 7a may be performed subsequent to completion of steps 1a-6a or may be performed incrementally as user device 102 navigates through multiple web pages. In some embodiments, providing the completed web forms to travel provider 106 signifies completion of the travel-related action. In some embodiments, step 7a may be performed automatically by user device 102 upon executing the instructions (e.g., in step 4a).

Figure 3B:
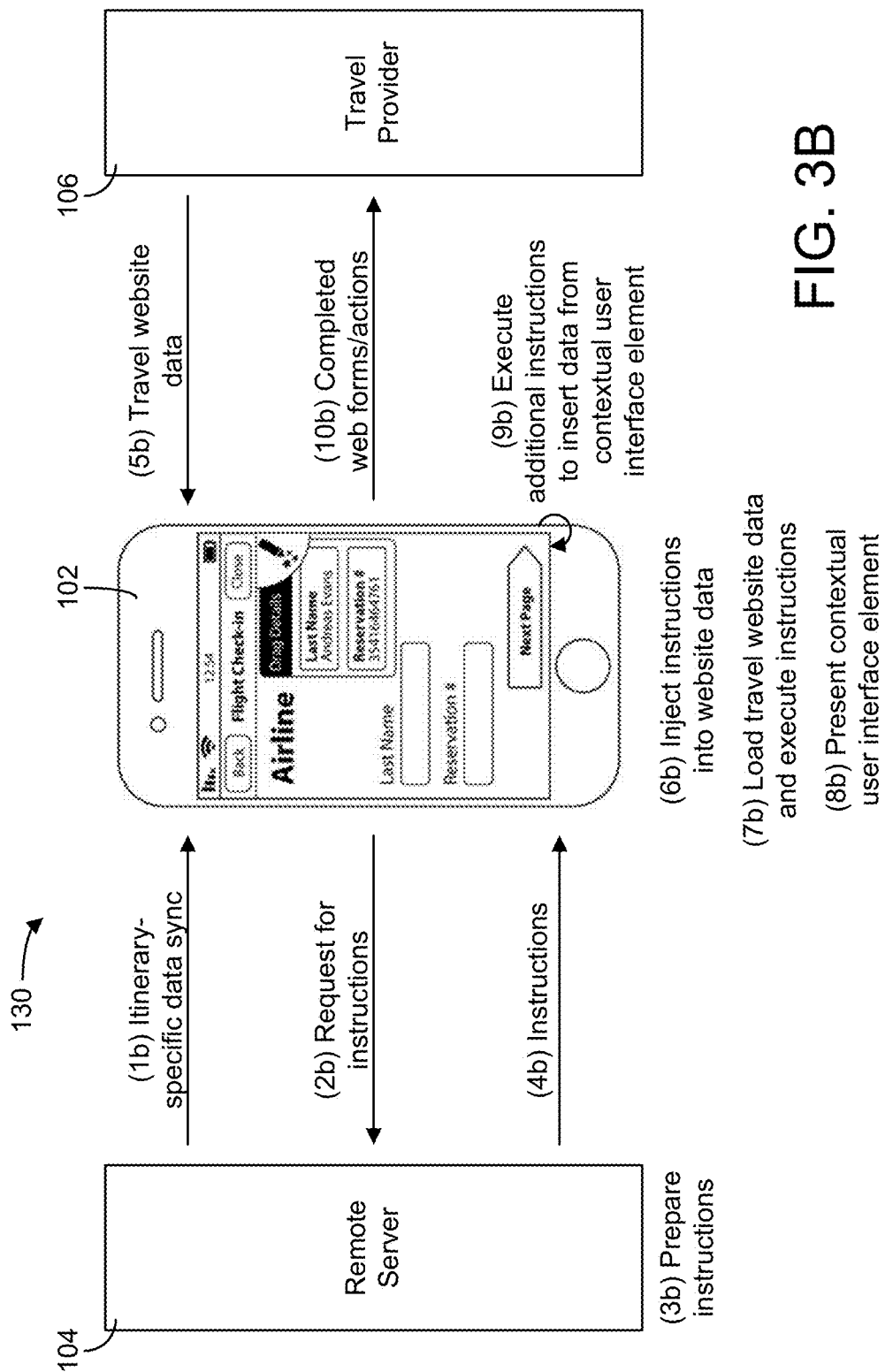
FIG. 3B is a system architecture diagram illustrating, in greater detail, the system of FIG. 1 and showing an alternate series process steps which may be performed by a remote server and a user device for facilitating interactions between the user device and a travel website, according to an exemplary embodiment.

Referring now to FIG. 3B, an alternate embodiment of the series of interactions between user device 102, remote server 104, and travel provider 106 is shown. The series of interactions illustrates another exemplary process for facilitating performance of travel-related actions by user device 102. The process illustrated in FIG. 3B may be used in place of or in addition to the process illustrated in FIG. 3A.

The illustrated process is shown to include synchronizing itinerary-specific data (step 1b). In step 1b, user device 102 may retrieve the most recent itinerary-specific data from remote server 104. The itinerary-specific data may include data relating to a particular travel itinerary or travel arrangement. For example, the itinerary-specific data may include a flight number, a reservation number, a confirmation number, a flight departure time, departure location, or any other information relating to a particular travel arrangement/itinerary.

In some embodiments, the itinerary-specific data includes data relating to both a particular user and a particular travel arrangement. Data relating to a particular user may include general user information which may be potentially relevant for more than one travel itinerary. For example, user-specific data may include the user's name, login information (e.g., for a particular travel website), passport information, phone number, emergency contact information, home address, or other information potentially relevant to a plurality of travel arrangements. In some embodiments, the itinerary-specific data includes all the raw information necessary to perform a travel-related action.

Still referring to FIG. 3B, the illustrated process is shown to include requesting instructions for performing a travel-related action (step 2b). The request for instructions may be sent from user device 102 to remote server 104 in response to a user input received at user device 102 requesting performance of a particular travel-related action. For example, user device 102 may submit a request for instructions to remote server 104 in response to a user selecting an icon presented via user device 102 for initiating an online check-in process. The request for instructions may include an indication of a particular travel itinerary.

The illustrated process is shown to further include preparing instructions for performing the travel-related action (step 3b) and providing the prepared instructions to the user device (step 4b). Steps 3b-4b may be performed by remote server 104 in response to a request for instructions received from user device 102. The instructions for performing the travel-related action may include a URL of a travel webpage. The URL may be a URL of a particular webpage of a travel website for initiating the travel-related action.

The instructions may further include instructions for navigating the travel website. The instructions for navigating the travel website may be site-specific instructions (e.g., specific to a particular travel website) and/or action-specific instructions (e.g., specific to a particular travel-related action). The instructions for navigating the travel website may include instructions for navigating from the provided URL of the travel webpage to the completion of the travel-related action. The instructions for navigating the travel website may include a series of web pages required to be loaded and/or a series of actions required to be performed by user device 102 to complete the travel-related action.

The instructions may further include instructions for instructions for automatically providing the itinerary-specific data to the travel website. In some embodiments, the instructions for providing the itinerary-specific data to the travel website include instructions for automatically populating form fields of the travel website with the itinerary-specific information. In other embodiments, the instructions for providing the itinerary-specific data to the travel website include instructions for generating contextual user interface element 112. The instructions for providing the itinerary-specific data to the travel website may include instructions for providing previously-received itinerary-specific data (e.g., data received in step 1b) or instructions for providing new/updated itinerary-specific data (e.g., included in the instructions, received from other sources, etc.).

In some embodiments, the instructions further include instructions for automatically providing user-specific data to the travel website or otherwise configuring the website for a particular user. The instructions for automatically providing user-specific data to the travel website may include instructions for providing login information to the website. Instructions for configuring the website for a particular user may include instructions for setting language, locale, or other user preferences when the website is displayed. In some embodiments, the instructions for providing user-specific data to the travel website or otherwise configuring the website for a particular user may be included in the itinerary-specific instructions and/or the navigation instructions.

In some embodiments, the instructions further include instructions for providing a contextual user interface element (e.g., contextual user interface element 112). The instructions for providing a contextual user interface element may include instructions for presenting particular itinerary-specific or user-specific data elements within contextual user interface element 112 when a particular webpage is loaded by user device 102. In some embodiments, the instructions for providing the contextual user interface element may include logic for determining whether a particular data element should be displayed. The instructions for providing the contextual user interface element may further include instructions for inserting a value of a data element into a form field in response to a user input received via user device 102 (e.g., dragging and dropping the data element into a space occupied by the form field, clicking the data element into the form field, etc.).

Still referring to FIG. 3B, the illustrated process is shown to further include receiving travel website data (step 5b). Step 5b may be performed by user device 102 by retrieving website data from travel provider 106. In some embodiments, step 5b may be performed by user device 102 in response to a user input received at user device 102. In other embodiments, step 5b may be performed by user device 102 in response to receiving instructions from remote server 104. The travel website data may include a series of web pages and one or more form fields requiring input from user device 102.

The illustrated process is shown to further include injecting the instructions into the website data (step 6b). Step 6b may be performed by user device 102 upon receiving both the travel website data from travel provider 106 and the instructions from remote server 104. In some embodiments, step 6b may be performed by an application (e.g., a mobile application) running on user device 102. In some embodiments, the instructions may be JavaScript® instructions and may be inserted into the existing website data as executable instructions. Injecting the instructions into the website data may create modified website data.

Still referring to FIG. 3B, the illustrated process is shown to include loading the travel website data and executing the instructions (step 7b). Step 7b may be performed by user device 102 upon receiving both the travel website data from travel provider 106 and the instructions from remote server 104. In some embodiments, step 7b may be performed by a web browser embedded in the application running on user device 102. Loading the travel website data may include loading the unmodified website data (e.g., the data received in step 5b) or loading the modified website data (e.g., the data created in step 6b).

Executing the instructions may include performing actions according to the instructions. For example, executing the instructions may include automatically populating form fields in the travel website data with the itinerary-specific and/or user-specific data. In some embodiments, executing the instructions includes automatically navigating between pages of the travel website. In some embodiments, executing the instructions includes both automatically populating form fields and automatically navigating between pages of the travel website. For example, executing the instructions may cause user device 102 to navigate to a particular webpage, populate form fields of the webpage, and proceed to navigate to another webpage. By executing the instructions, user device 102 may automatically perform some or all of the operations required to complete the travel-related action.

Still referring to FIG. 3B, the illustrated process is shown to include presenting a contextual user interface element (step 8b). Step 8b may be performed by user device 102 in addition to or in place of step 7b. The contextual user interface element (e.g., element 112) may be an electronic "wallet" including one or more itinerary-specific or user-specific data elements which may be applied to form fields in the travel website data. In some embodiments, user device 102 selects particular data elements to include in contextual user interface element 112 based on the content of the webpage displayed (e.g., HTML content, XML content, metadata content, etc.). In other embodiments, user device selects data elements to include in the contextual user interface element using the instructions for providing the contextual user interface element (e.g., received in step 4b).

The illustrated process is shown to further include executing additional instructions to insert data from the contextual user interface element (step 9b). Step 9b may be performed in response to a user input received via a user interface element of user device 102. For example, as described with reference to FIG. 2, a user may drag and drop data elements from the contextual user interface element into form fields of the travel website. Dropping a data element into a space occupied by a form field may cause user device 102 to execute additional instructions for automatically inserting the value of the data element into the form field.

Still referring to FIG. 3B, the illustrated process is shown to further include providing the completed web forms to travel provider 106 (step 10b). Step 10b may be performed subsequent to completion of steps 1b-9b or may be performed incrementally as user device 102 navigates between web pages. In some embodiments, providing the completed web forms to travel provider 106 signifies completion of the travel-related action. In some embodiments, step 10b may be performed automatically by user device 102 upon executing the instructions (e.g., in step 7b).

Figure 4:
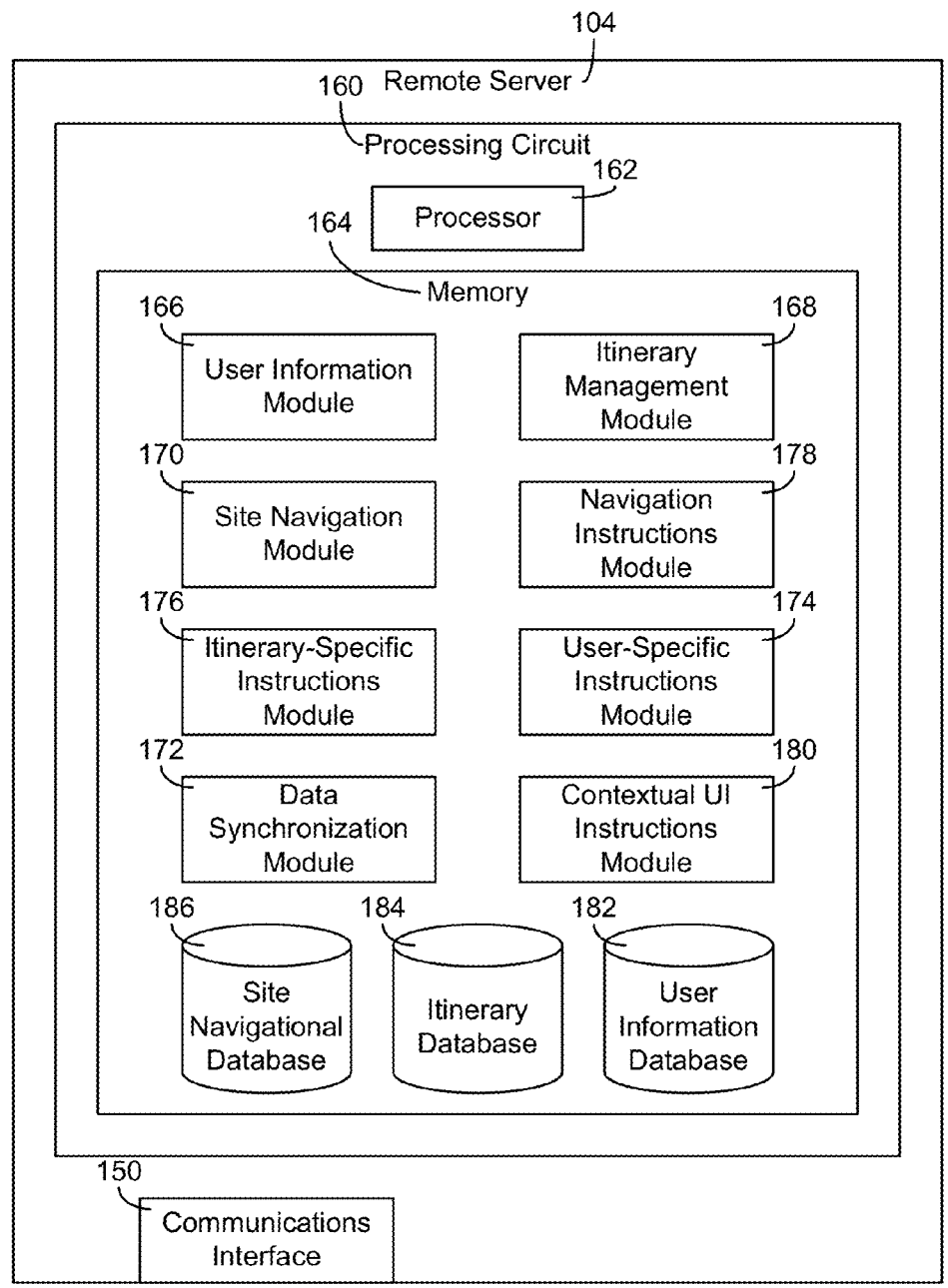
FIG. 4 is a block diagram illustrating, in greater detail, the remote server shown in FIGS. 3A-3B, according to an exemplary embodiment.

Referring now to FIG. 4, a detailed block diagram of remote server 104 is shown, according to an exemplary embodiment. Remote server 104 is shown to include a communications interface 150 and a processing circuit 160. Communications interface 150 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 150 may allow remote server 104 to communicate with user device 102 and travel provider 106.

Still referring to FIG. 4, processing circuit 160 is shown to include a processor 162 and memory 164. Processor 162 may be implemented as a general purpose processor, an application specific integrated circuit (ASIC), one or more field programmable gate arrays (FPGAs), a CPU, a GPU, a group of processing components, or other suitable electronic processing components.

Memory 164 may include one or more devices (e.g., RAM, ROM, Flash® memory, hard disk storage, etc.) for storing data. For example, memory 164 is shown to include a user information database 182, an itinerary database 184, and a site navigation database 186. Databases 182-186 may be any type of memory device capable of user profile data, itinerary-specific data, site navigation data, or any other type of data used by remote server 104 and/or user device 102. Databases 182-186 may include any type of non-volatile memory, media, or memory devices. For example, databases 182-186 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some embodiments, databases 182-186 may be local to remote server 104. In other embodiments, databases 182-186 may be remote data storage devices connected with remote server 104 via a computer network (e.g., a LAN, WAN, the Internet, etc.). In some embodiments, databases 182-186 may be part of a data storage server or system capable of receiving and responding to queries for information.

Memory 164 may include one or more devices for completing and/or facilitating the various processes, layers, and modules described in the present disclosure. Memory 164 may comprise volatile memory or non-volatile memory. Memory 164 may include database components, object code components, script components, or any other type of information structure for supporting the various activities and information structures described in the present disclosure. In some implementations, memory 164 is communicably connected to processor 162 via processing circuit 160 and includes computer code (e.g., data modules stored in memory 164) for executing one or more processes described herein.

Still referring to FIG. 4, memory 164 is shown to include a user information module 166. User information module 166 may be responsible for receiving and managing user-specific data. User information module 166 may receive user-specific data from user device 102 or other data sources and may store the user-specific data in user information database 182. User information module 166 may be responsible writing user-specific information to user information database 182 and reading user-specific information from user information database 182. User-specific data may include general user data that is not limited to a single travel itinerary (e.g., user profile data, user preferences, etc.). For example, user specific data may include a user's name, telephone number, home address, preferred language, travel preferences, billing information, account login information, or other information that may apply to a plurality of travel itineraries.

Still referring to FIG. 4, memory 164 is shown to further include an itinerary management module 168. Itinerary management module 168 may be responsible for receiving, managing, and updating itinerary-specific data. Itinerary management module 168 may receive itinerary-specific information from user device 102 or other data sources and may store itinerary-specific data in itinerary database 184. Itinerary management module 168 may be responsible writing itinerary-specific information to itinerary database 184 and reading itinerary-specific information from itinerary database 184. Itinerary-specific data may include data relating to particular travel arrangements. For example, when a user purchases a flight ticket, information relating to the travel arrangement (e.g., flight number, reservation number, departure time, departure location, passenger name, etc.) may provided to itinerary management module 168 and stored in itinerary database 184.

In some embodiments, itinerary management module 168 interacts with travel provider 106 to retrieve detailed information relating to various travel arrangements and updates the itinerary-specific data in itinerary database 184 if any of the itinerary details change. In some embodiments, itinerary-specific data includes data relating to both a particular user and a particular travel arrangement. In other words, itinerary-specific data may include user-specific data. In some embodiments, the itinerary-specific data includes all the raw information necessary to perform a travel-related action.

Itinerary management module 168 may be configured to synchronize itinerary data with user device 102 in response to a synchronization request from user device 102. Itinerary management module 168 may prepare updated itinerary data in response to the synchronization request and send the updated itinerary data (e.g., via communications interface 150) to user device 102.

Still referring to FIG. 4, memory 164 is shown to further include a site navigation module 170. Site navigation module 170 may be responsible for receiving, managing, and updating site-specific navigation data. Site navigation module 170 may receive site-specific navigation data from various travel providers and/or travel websites and store the site-specific navigation data in site navigation database 186. Site navigation module 170 may be responsible writing site-specific navigation data to site navigation database 186 and reading site-specific navigation data from site navigation database 186.

In some embodiments, site-specific navigation data includes data describing a sequence of steps required to perform a travel-related action for a particular travel website. For example, a particular travel website may require a user to login at a first webpage, enter a confirmation number at a second webpage, and finally click a confirmation button at a third web page. The site-specific navigation data may provide navigation logic for performing a particular travel-related action at a particular travel website. Site-specific navigation data may be extracted from travel websites, provided by travel provider 106, or otherwise obtained from any other data source.

In some embodiments, site navigation module 170 manages a database of URLs for performing various travel-related actions. The URLs may indicate a particular webpage of a travel website for initiating a particular travel-related action. For example, within a travel website operated by an airline, the URL of the webpage for checking-in for a flight may be different than the URL of the webpage for changing a departure time or cancelling a flight reservation. Site navigation module 170 may maintain a list of direct URLs to the specific web pages for performing travel-related actions. Site navigation module 170 may store the URLs and the associated travel-related actions in site navigation database 186. In some embodiments, site navigation module 170 provides a URL to user device 102 in response to a request for instructions for completing a travel-related action. The URL may be a direct link to the exact webpage for completing the requested travel-related action.

Still referring to FIG. 4, memory 164 is shown to include a data synchronization module 172. Data synchronization module 172 may be configured synchronize itinerary-specific data and instructions for performing a travel-related action with user device 102. Synchronizing itinerary-specific data and instructions may include sending updated itinerary data and/or instructions to user device 102. In some embodiments, data synchronization module 172 synchronizes an itinerary with user device 102 when an itinerary item is changed. Data synchronization module 172 may interact with itinerary management module 168 to determine whether an itinerary has been changed. Data synchronization module 172 may interact with site navigation module 170 to determine the information required by the identified travel website for completing the travel-related action.

In some embodiments, data synchronization module 172 determines whether the identified travel website is a supported website for automatically populating form fields. If the travel website is supported, data synchronization module 172 may determine that it is unnecessary to prepare instructions for presenting contextual user interface element 112. However, if the travel website is unsupported, data synchronization module 172 may determine that instructions for presenting contextual user interface element 112 should be prepared.

Data synchronization module 172 may identify the information necessary to complete a travel-related action and interact with user information module 166, itinerary management module 168, and/or site navigation module 170 to obtain the required information. Data synchronization module 172 may call one or more of user-specific instructions module 174, itinerary-specific instructions module 176, navigation instructions module 178, and contextual user interface element instructions module 180 to prepare instructions for performing the travel-related action.

Still referring to FIG. 4, memory 164 is shown to include a user-specific instructions module 174. User-specific instructions module 174 may be configured to generate instructions for providing user-specific information to a travel website. User-specific instructions module 174 may interact with data synchronization module 172 to identify the particular items of user-specific information for which instructions are required. User-specific instructions module 174 may generate instructions for providing the identified user-specific information from user device 102 to the travel website. In some embodiments, user-specific instructions may include instructions for automatically populating form fields of the travel website with user-specific data. The user-specific data may be data already stored on user device 102 or data communicated to user device 102 along with the requested instructions.

Memory 164 is shown to further include an itinerary-specific instructions module 176. Itinerary-specific instructions module 176 may be configured to generate instructions for providing itinerary-specific information to a travel website. Itinerary-specific instructions module 176 may interact with data synchronization module 172 to identify the particular items of itinerary-specific information for which instructions are required.

Itinerary-specific instructions module 176 may generate instructions for providing the identified itinerary-specific information from user device 102 to the travel website. In some embodiments, the itinerary-specific instructions may include instructions for populating form fields of the travel website with itinerary-specific data. The itinerary-specific data used to populate the form fields may be data already stored on user device 102 (e.g., in response to a synchronization request) or data communicated to user device 102 along with the requested instructions.

Still referring to FIG. 4, memory 164 is shown to include a navigation instructions module 178. Navigation instructions module 178 may be configured to generate instructions for navigating a travel website. Advantageously, the navigation instructions may be site-specific instructions relating to a particular travel website. The navigation instructions may include a URL of a webpage for initiating the travel-related action as well as a sequence of steps or actions necessary to complete the travel-related action. For example, a particular travel website may require a user to login at a first webpage, enter a confirmation number at a second webpage, and finally click a confirmation button at a third web page.

Navigation instructions module 178 may generate instructions for navigating from a webpage associated with the provided URL to a final webpage for completing the travel-related action. In some embodiments, the navigation instructions include multiple lines of computer code for automatically populating form fields of the travel website. In some embodiments, the navigation instructions include multiple lines of computer code for automatically following hyperlinks within the travel website for advancing to another webpage (e.g., the next webpage in the chain of web pages which must be completed/loaded for performing the travel-related action) or submitting the populated data to the travel provider.

Still referring to FIG. 4, memory 164 is shown to include a contextual user interface element instructions module 180. Contextual user interface element instructions module 180 may be configured to generate instructions for presenting contextual user interface element 112. Instructions for presenting contextual user interface element 112 may include instructions for selecting particular data elements to include in contextual user interface element 112. In some embodiments, the instructions include selection logic based on the content of the webpage displayed (e.g., HTML content, XML content, metadata content, etc.). In other embodiments, the instructions may include instructions to present specific data elements when a particular webpage is displayed.

Contextual user interface element instructions module 180 may generate instructions for inserting data from contextual user interface element 112 into an identified form field of the travel website. For example, as described with reference to FIG. 2, a user may drag and drop data elements from contextual user interface element 112 into form fields of the travel website. Contextual user interface element instructions module 180 may generate instructions specifying that when a data element is dragged from contextual user interface element 112 into a space occupied by a form field, the value of the data element should be automatically inserted into the form field.

Figure 5:
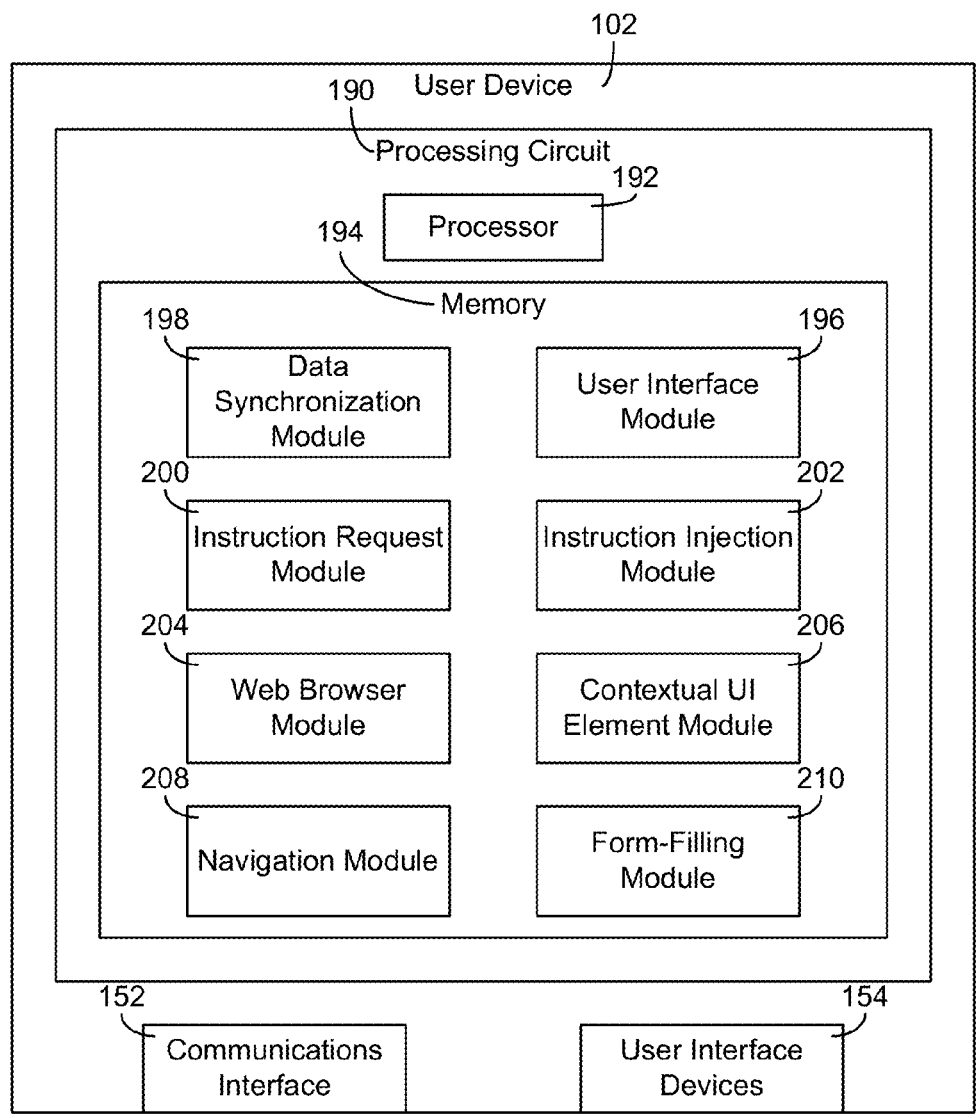
FIG. 5 is a block diagram illustrating, in greater detail, the user device shown in FIGS. 3A-3B, according to an exemplary embodiment.

Referring now to FIG. 5, a detailed block diagram of user device 102 is shown, according to an exemplary embodiment. User device 102 is shown to include communications interface 152, user interface devices 154, and a processing circuit 190. Communications interface 152 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 152 may allow user device 102 to communicate with remote server 104 and/or travel provider 106. Communications interface 152 may allow user device 102 to communicate with a wireless networking device (e.g., a wireless router, wireless-enabled computer, laptop, tablet, cell tower, etc.) or a wired networking device (e.g., via an Ethernet cable, a SATA cable, USB cable, or other physical data connection).

User interface devices 154 may include one or more user input devices (e.g., for receiving input from a user) and one or more user output devices (e.g., for presenting information to a user). User input devices may include devices that utilize touch-sensitive technology (e.g., capacitive touch, piezoelectric, etc.) field-of-effect technology (e.g., projected capacitive, electrostatic, etc.), as well as traditional input devices (e.g., keyboard, mouse, microphone, etc.). Input devices may include one or more buttons, keys, dials, sliders, microphones, or other elements capable of receiving tactile input from a user.

User output devices may further include an electronic display (e.g., a liquid crystal display (LCD), organic light emitting diode (OLED), thin film transmitter (TFT), or other monitor capable of displaying information or providing visual feedback to a user). In some embodiments, user output devices include a touch-sensitive display capable of both displaying information and receiving a user's touch input. In some embodiments, user input devices and user output devices are combined into an integrated touch-sensitive display device.

Still referring to FIG. 5, processing circuit 190 is shown to include a processor 192 and memory 194. Processor 192 may be implemented as a general purpose processor, an application specific integrated circuit (ASIC), one or more field programmable gate arrays (FPGAs), a CPU, a GPU, a group of processing components, or other suitable electronic processing components.

Memory 194 may include one or more devices (e.g., RAM, ROM, Flash® memory, hard disk storage, etc.) for storing data and/or computer code for completing and/or facilitating the various processes, layers, and modules described in the present disclosure. Memory 194 may comprise volatile memory or non-volatile memory. Memory 194 may include database components, object code components, script components, or any other type of information structure for supporting the various activities and information structures described in the present disclosure. In some implementations, memory 194 is communicably connected to processor 192 via processing circuit 190 and includes computer code (e.g., data modules stored in memory 194) for executing one or more processes described herein.

In brief overview, memory 194 is shown to include a user interface module 196, a data synchronization module 198, an instruction request module 200, an instruction injection module 202, a web browser module 204, a contextual user interface element module 206, a navigation module 208, and a form filling module 210. Some or all of memory modules 196-210 may be part of an application configured to run on user device 102 (e.g., a mobile application).

User interface module 196 may be configured to generate a user interface for presentation to a user via user interface devices 154. Advantageously, user interface module 196 may present a single user-friendly interface for interacting with many different travel websites without requiring a user to learn the interfaces associated with a variety of different travel websites. In some embodiments, user interface module 196 generates a user interface for presenting itinerary-specific information. User interface module 196 may create a user interface including one or more selectable options (e.g., buttons, icons, tiles, etc.) for initiating a travel-related action. An exemplary user interface which may be generated by user interface module 196 is described in greater detail with reference to FIG. 6.

Still referring to FIG. 5, memory 194 is shown to include a data synchronization module 198. Data synchronization module 198 may be configured to retrieve updated data from remote server 104. Updated data may include itinerary-specific data, user-specific data, or other travel-related data managed by remote server 104. In some embodiments, data synchronization module 198 submits a request for updated data in response to a user input received via user interface devices 154. In other embodiments, data synchronization module 198 submits a request for updated data periodically, automatically, or in response to another update trigger (e.g., launching a mobile application, viewing itinerary data for a particular travel arrangement, etc.). Data synchronization module 198 may receive itinerary-specific data from remote server 104 and store the itinerary-specific data within memory 194.

In some embodiments, data synchronization module may be configured to receive instructions from remote server 104. The instructions may include instructions for performing the travel-related action. The instructions for performing the travel-related action may be received from remote server 104 as part of the data synchronization.

Memory 194 is shown to further include an instruction request module 200. Instruction request module 200 may be configured to submit a request for instructions for performing a travel-related action to remote server 104. In some embodiments, instruction request module 200 is not necessary because the instructions may have already been received as part of a prior data synchronization. In other embodiments, instruction request module 200 may submit a request for instructions to remote server 104 in response to a user input received via user interface devices 154 requesting performance of a travel-related action. For example, user interface module 196 may generate a user interface including a selectable icon labeled "Flight check-in available." Instruction request module 200 may submit a request for instructions for performing the flight check-in in response to a user selection of the selectable icon.

In some embodiments, the request for instructions includes an indication of a particular travel arrangement and/or an indication of the particular travel-related action for which instructions are requested. Remote server 104 may use the indication of the particular travel arrangement and/or the indication of the particular travel-related action to generate a set of instructions for performing the travel-related action. Remote server may provide the requested instructions to user device 102.

Still referring to FIG. 5, memory 194 is shown to include a web browser module 204. Web browser module 204 may include instructions for executing a web browser on user device 102. In some embodiments, the web browser may be embedded within a mobile application running on user device 102. Web browser module 204 may receive the requested instructions from remote server 104. In some embodiments, the instructions include one or more URLs specifying the locations of web pages for performing the travel-related action. Web browser module 204 may be configured to download one or more web pages (i.e., website data) from a travel website using the URL information provided in the instructions.

Memory 194 is shown to further include an instruction injection module 202. Instruction injection module 202 may receive the requested instructions from remote server 104. Instruction injection module 202 may also receive the downloaded website data (i.e., "existing website data") from the travel website. The website data may include one or more website files (e.g., .htm files, etc.) which can be loaded by web browser module 204. Instruction injection module 202 may create a modified website file by injecting by injecting the instructions into an existing website file. In some embodiments, the modified website file includes one or more form fields pre-populated with itinerary-specific and/or user-specific data. In some embodiments, the instructions are JavaScript® instructions. Injecting the instructions into the website file may include inserting the instructions into the existing website file as executable instructions.

Instruction injection module may provide the modified website file to web browser module 204. Web browser module 204 may be configured to load the modified website file including the executable instructions injected therein. Loading the modified website file may cause web browser 204 to execute the injected instructions and perform operations according to the injected instructions. In some embodiments, the instructions include multiple lines of computer code for automatically navigating between pages of the travel website, instructions for automatically filling form fields of the travel website and/or instructions for presenting contextual user interface element 112 along with the existing website data. In some embodiments, the instructions are executed by web browser module 204 and it is web browser module 204 that performs the operations according to the instructions. In other embodiments, the instructions are executed by a separate data module of memory 194.

Still referring to FIG. 5, memory 194 is shown to include a contextual user interface element module 206, a navigation module 208, and a form-filling module 210. Modules 206-210 may be configured to execute the instructions received from remote server 104. In some embodiments, modules 206-210 may be components of web browser module 204. In other embodiments, modules 206-210 may be conceptually or functionally separate data modules. For example, modules 206-210 may be modules of an application running on device 102 (e.g., a mobile application) into which the web browser is embedded. In some embodiments, modules 206-210 execute instructions which have been injected into existing website data (e.g., by instruction injection module 202). In other embodiments, modules 206-210 execute the instructions received from remote server 104 without requiring that the instructions be injected into website data.

Navigation module 208 may be configured to execute instructions for navigating a travel website. In some embodiments, the instructions for navigating a travel website are site-specific instructions relating to a particular travel website. The navigation instructions may include a URL of a webpage for initiating the travel-related action as well as a sequence of steps or actions necessary to complete the travel-related action. For example, a particular travel website may require a user to login at a first webpage, enter a confirmation number at a second webpage, and finally click a confirmation button at a third web page.

Navigation module 208 may execute instructions for navigating from a webpage associated with the provided URL to a final webpage for completing the travel-related action. In some embodiments, navigation module 208 causes web browser module 204 to automatically follow hyperlinks within the travel website for advancing to another webpage (e.g., the next webpage in the chain of web pages which must be completed/loaded for performing the travel-related action) or submitting the data (e.g., populated web forms) to a travel provider.

Form-filling module 210 may be configured to execute instructions for automatically populating form fields of the travel website with itinerary-specific data and/or user-specific data. Form-filing module 210 may populate form fields with user-specific and/or itinerary-specific data included in the instructions received from remote server 104 or with data previously stored on user device 102 (e.g., by data synchronization module 198). In some embodiments, form-filling module populates form fields according to literal instructions received from remote server 104. In other embodiments, form-filling module 210 populates form fields according to independent form-filling logic (e.g., in place of or in addition to the instructions received from remote server 104). For example, form-filling module 210 may identify form fields based on the content of the website data (e.g., metadata, HTML data, etc.) and automatically fill identified form fields with itinerary-specific or user-specific data designated for an identified form field.

Still referring to FIG. 5, memory 194 is shown to include a contextual user interface element module 206. Contextual user interface element module 206 may be configured to present a contextual user interface element (e.g., contextual user interface element 112) along with the website data. Contextual user interface element 112 may include one or more of the itinerary-specific data received from remote server 104. Advantageously, contextual user interface element module 206 may be used to display itinerary-specific data in a format that can be easily applied to form fields in the travel website when automatic population is unavailable (e.g., for unsupported or recently-changed websites).

In some embodiments some embodiments, contextual user interface element module 206 may be configured to display data elements relevant to a particular web page. Contextual user interface element module 206 may determine which data elements are relevant to a particular web page based on the content of the web page data (e.g., HTML data, XML data, form field names, etc.). Contextual user interface element module 206 may add, remove, re-organize, or otherwise adjust the data elements presented in contextual user interface element 112 based on the context provided by the web page data. For example, as user device 102 navigates from page to page (e.g., automatically or in response to a user input), contextual user interface element module 206 may adjust the data elements displayed in contextual user interface element 112. In some embodiments, contextual user interface element module 206 identifies itinerary-specific data elements corresponding to the form fields in the web page (e.g., based on the content of the web page) and presents the identified data elements in contextual user interface element 112.

In some embodiments, contextual user interface element module 206 executes instructions generated by remote server 104 (e.g., by contextual user interface element instructions module 180) for presenting contextual user interface element 112. Instructions for presenting contextual user interface element 112 may include instructions for selecting particular data elements to include in contextual user interface element 112. In some embodiments, the instructions include selection logic based on the content of the webpage displayed. In other embodiments, the instructions specify particular data elements to present when a particular webpage is displayed.

Contextual user interface element module 206 may be configured to execute additional instructions to insert data from contextual user interface element 112 into a form field of the travel website. For example, as described with reference to FIG. 2, a user may drag and drop data elements from contextual user interface element 112 into form fields of the travel website. Dropping a data element into a space occupied by a form field may cause contextual user interface element module 206 to execute additional instructions for automatically inserting the value of the data element into the form field.

Figure 6:
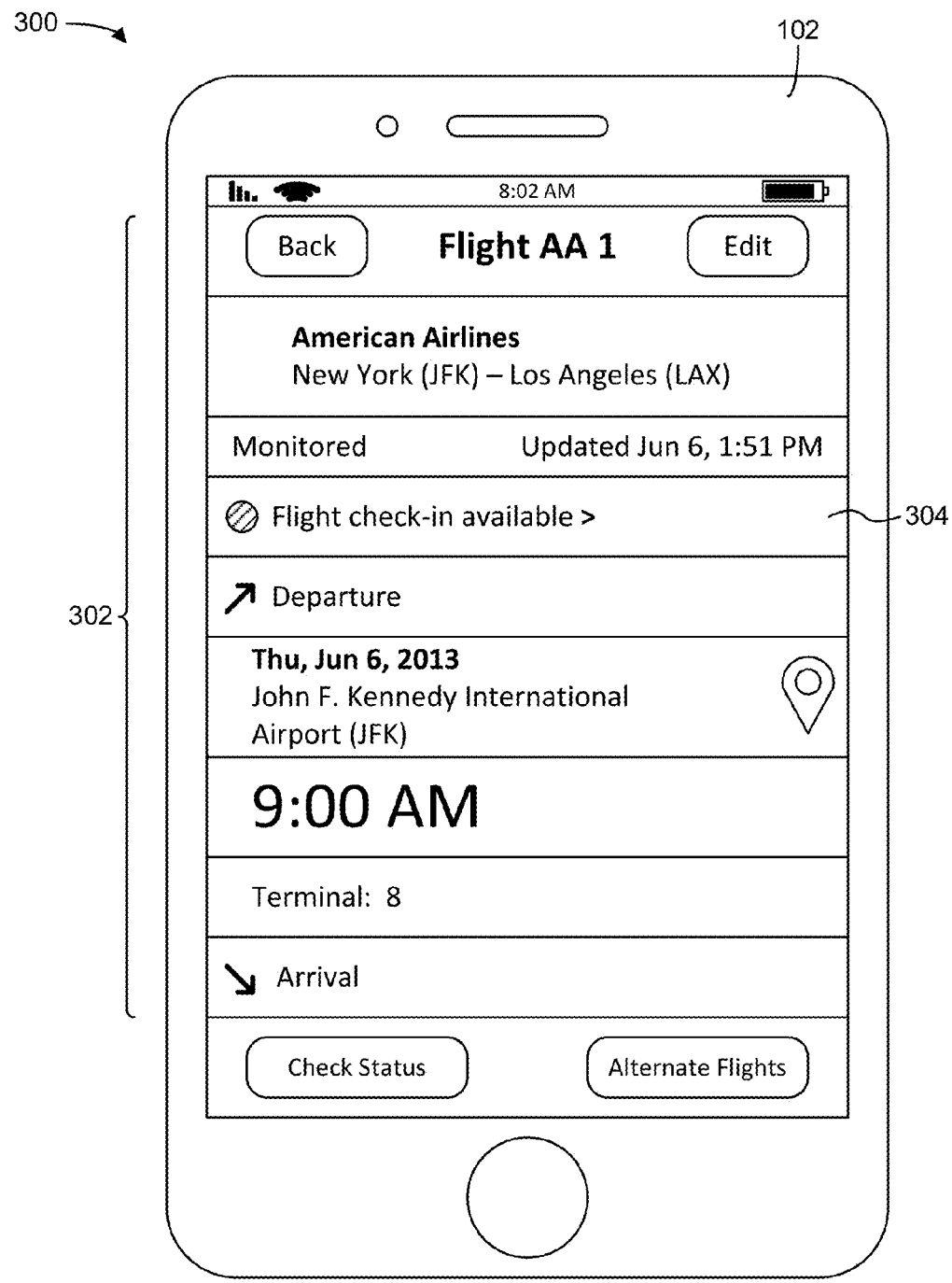
FIG. 6 is a drawing of a user interface which may be presented via the user device, showing a selectable icon for initiating a process to automatically perform a travel-related action, according to an exemplary embodiment.

Referring now to FIG. 6, a drawing of a user interface 300 which may be generated by user interface module 196 is shown, according to an exemplary embodiment. User interface 300 may be presented via a user interface element (e.g., user interface devices 154) of user device 102. Advantageously, user interface 300 may be used to facilitate user interactions with many different travel websites, thereby eliminating the need for users to learn and navigate multiple different user interfaces for each new travel website.

User interface 300 is shown to include itinerary-specific information 302. Itinerary-specific information 302 may be received from remote server 104 in response to a request for itinerary synchronization from data synchronization module 198. As illustrated in FIG. 6, itinerary-specific information may include information relating to a particular flight. For example, itinerary-specific information 302 is shown to include a flight name (e.g., "AA 1"), an airline name (e.g., "American Airlines"), a departure location (e.g., "New York (JFK)"), an arrival location (e.g., "Los Angeles (LAX)"), a terminal "e.g., "Terminal: 8"), and a departure time (e.g., "9:00 AM").

User interface 300 is shown to further include a selectable icon 304. Selectable icon 304 may be displayed when a travel-related action is available to be performed. For example, online check-in for a particular flight may become available one hour before the flight departure time. User device 102 may receive a notification from remote server 104 or may independently determine that online flight check-in is available when the current time is within the one hour window before the flight departure time. In response to a determination (e.g., by remote server 104 or by user device 102) that a travel-related action is available, selectable icon 304 may be displayed within user interface 300.

Selectable icon 304 is shown displaying an indication of the travel-related action (e.g., "Flight check-in") associated with selectable icon 304. Selecting selectable icon 304 (e.g., tapping, clicking, etc.) may cause user device 102 to submit a request for instructions for performing the associated travel-related action. Additionally, selecting selectable icon 304 may cause user device 102 (e.g., a web browser running on user device 102) to navigate directly to a webpage through which the associated travel-related action may be performed. For example, selecting selectable icon 304 may cause user device 102 to navigate to a webpage for performing online check-in for the flight identified by itinerary-specific information 302.

Referring now to FIGS. 7-12, a user interface 400 for presenting itinerary-specific data in a contextual user interface element is shown, according to an exemplary embodiment. In some embodiments, user interface 400 is presented in response to a user selecting selectable icon 304 in user interface 300. User interface 400 may be presented by user device 102 (e.g., via user interface devices 154) and may be generated by an application running on user device 102 (e.g., by contextual user interface element module 206).

User interface 400 may be presented concurrently with one or more web pages of a travel website through which a travel-related action can be performed. For example, referring specifically to FIG. 7, user interface 400 is shown overlaid with a webpage through which a user can check-in for a flight. The webpage may be displayed by user device 102 (e.g., via web browser module 204) in response to a user selection of selectable icon 304 (e.g., via user interface 300). In some implementations, the webpage includes one or more form fields which must be completed to perform the travel-related action. For example, the webpage is shown to include a "Last Name" form field 404 and a "Reservation #" form field 406.

Figure 7:
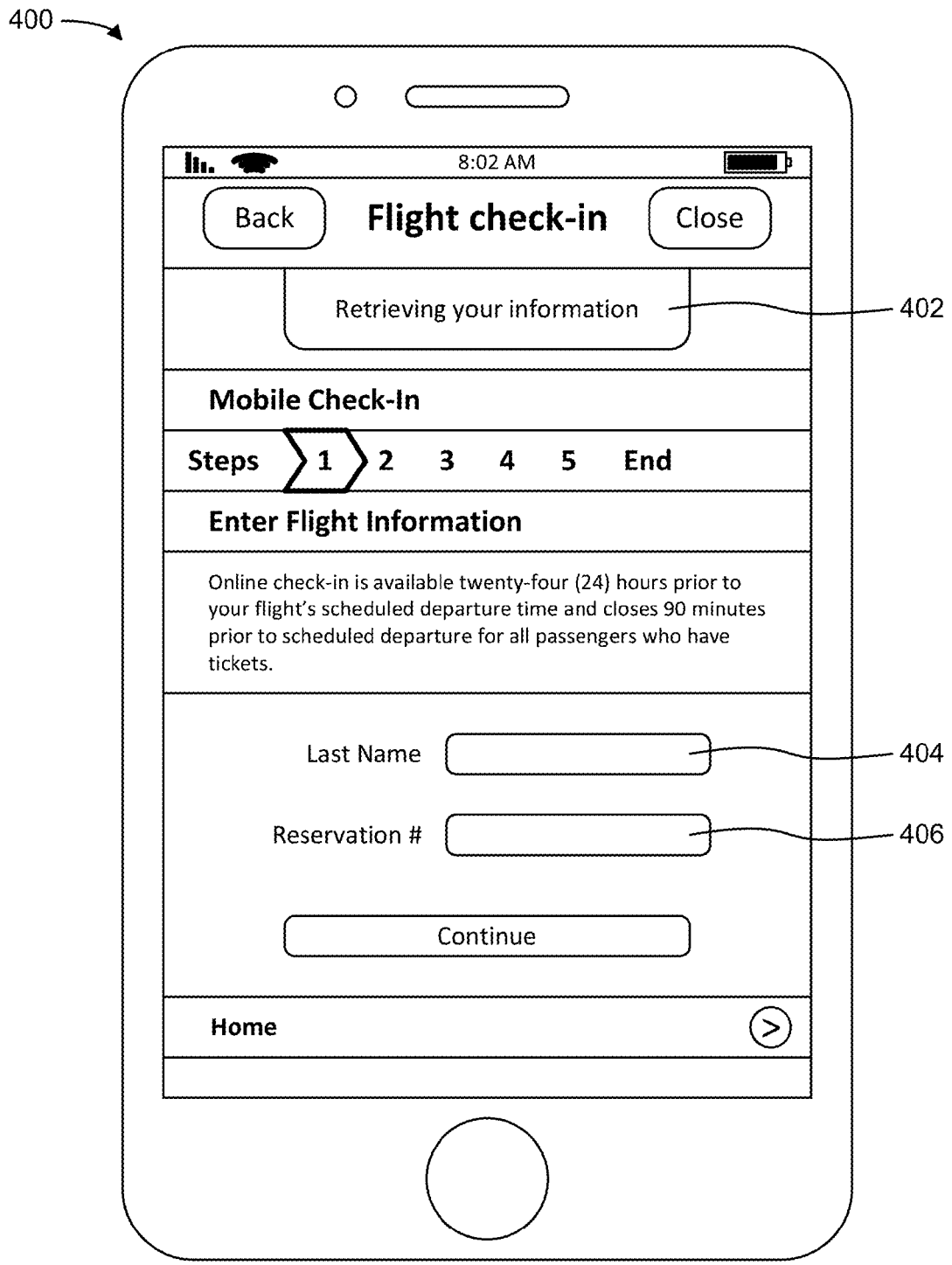
FIGS. 7-12 are drawings of another user interface which may be presented via the user device in response to a user selection of the selectable icon of FIG. 6, the user interface illustrating, in greater detail, the contextual user interface element of FIG. 2, according to an exemplary embodiment.

Still referring to FIG. 7, user interface 400 is shown to include an information box 402. Information box 402 may display a current status of a data fetching process. For example, information box 402 may be displayed while user device 102 is retrieving the itinerary-specific or user-specific data from remote server 104.

Figure 8:
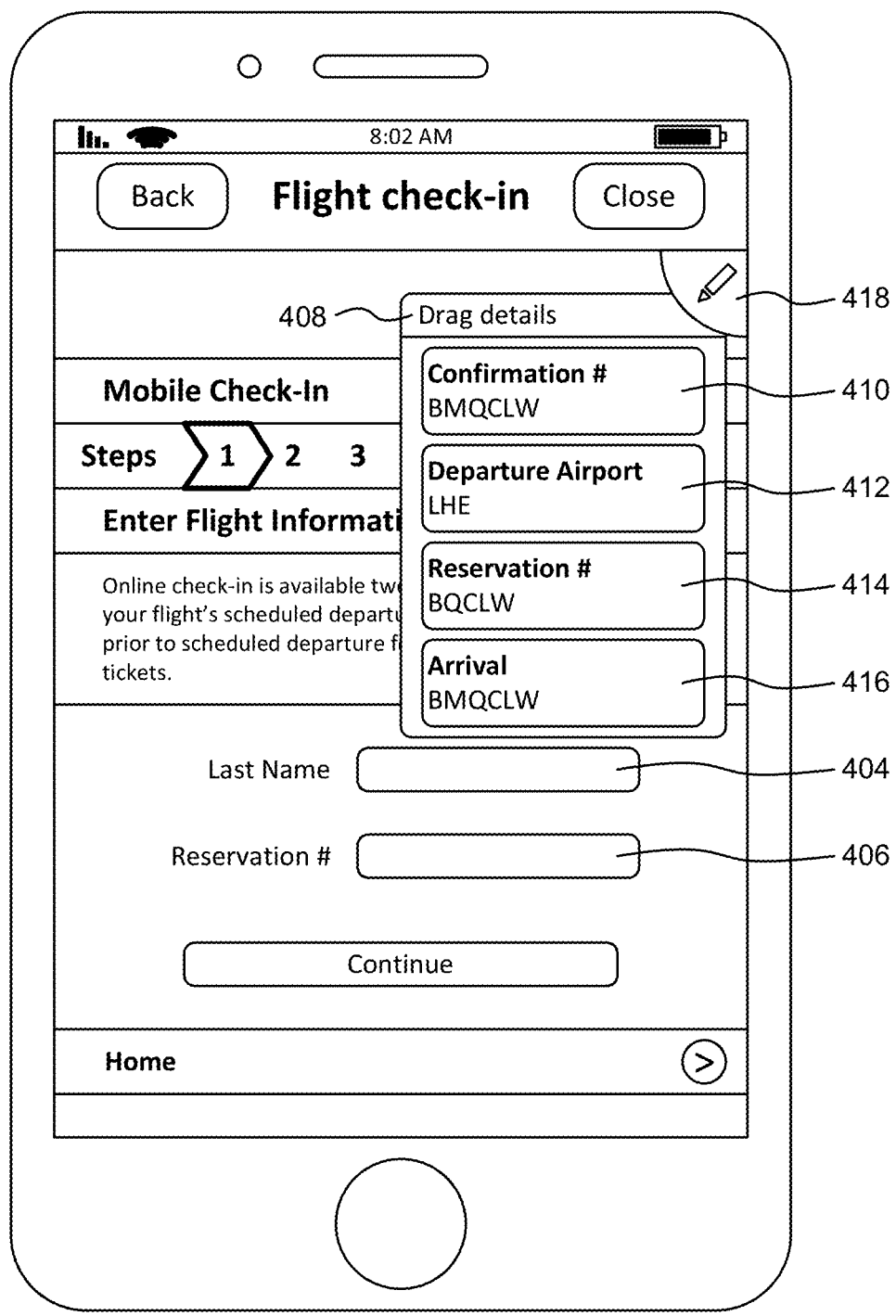

Referring now to FIG. 8, user interface 400 is shown to include a contextual user interface element 408. Contextual user interface element 408 may be displayed after the itinerary-specific or user-specific data is received at user device 102. Contextual user interface element 408 is shown to include a plurality of data elements 410-416. Data elements 410-416 may correspond to particular items of the itinerary-specific data (e.g., flight confirmation number, departure airport, reservation number, etc.). In some embodiments, data elements displayed in contextual user interface element 408 include an indication of the type of data element (e.g., data element name, description, title, etc.) and a value of the data element. For example, the value of "Reservation #" data element 414 is shown as "BQCLW." Advantageously, contextual user interface element 408 can be used to display itinerary-specific data in a format that can be easily applied to form fields in the travel website when automatic population is unavailable.

In some embodiments, user interface 400 may be configured to display data elements in contextual user interface element 408 which are relevant the webpage being concurrently displayed. User device 102 may determine which data elements are relevant to a particular web page based on the content of the web page data (e.g., HTML data, XML data, metadata, form field names, etc.) or based on instructions/logic received from remote server 104. User device 102 may add, remove, re-organize, or otherwise adjust the data elements presented in contextual user interface element 408 when a new webpage is loaded.

User interface 400 is shown to further include a toggle button 418. Selecting toggle button 418 (e.g., tapping, clicking, etc.) may cause contextual user interface element 408 to be displayed (e.g., as shown in FIGS. 8-11) or hidden (e.g., as shown in FIG. 12).

Figure 9:
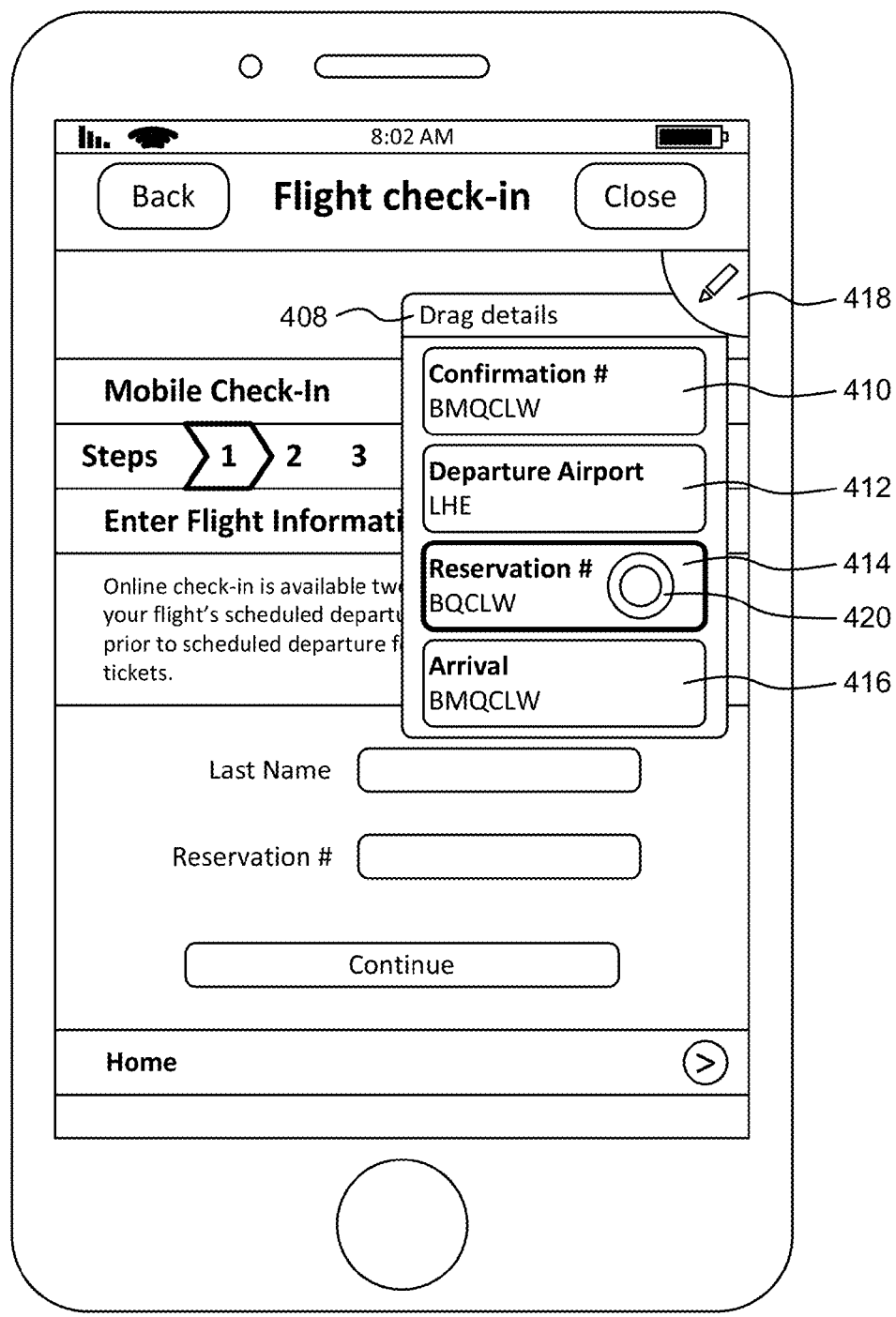

Referring now to FIG. 9, in some embodiments, user interface 400 presents the data elements displayed in contextual user interface element 408 as selectable icons. A user may select a data element by tapping, clicking, highlighting, or otherwise interacting with the selectable icon associated with the data element. For example, a user may select "Reservation #" data element 414 by tapping or clicking an area within the selectable icon (e.g., at click/tap location 420). In some embodiments, selecting an icon may cause the icon to change colors, become highlighted, emphasized, bolded, outlined, or otherwise marked as having been selected.

Figure 10:
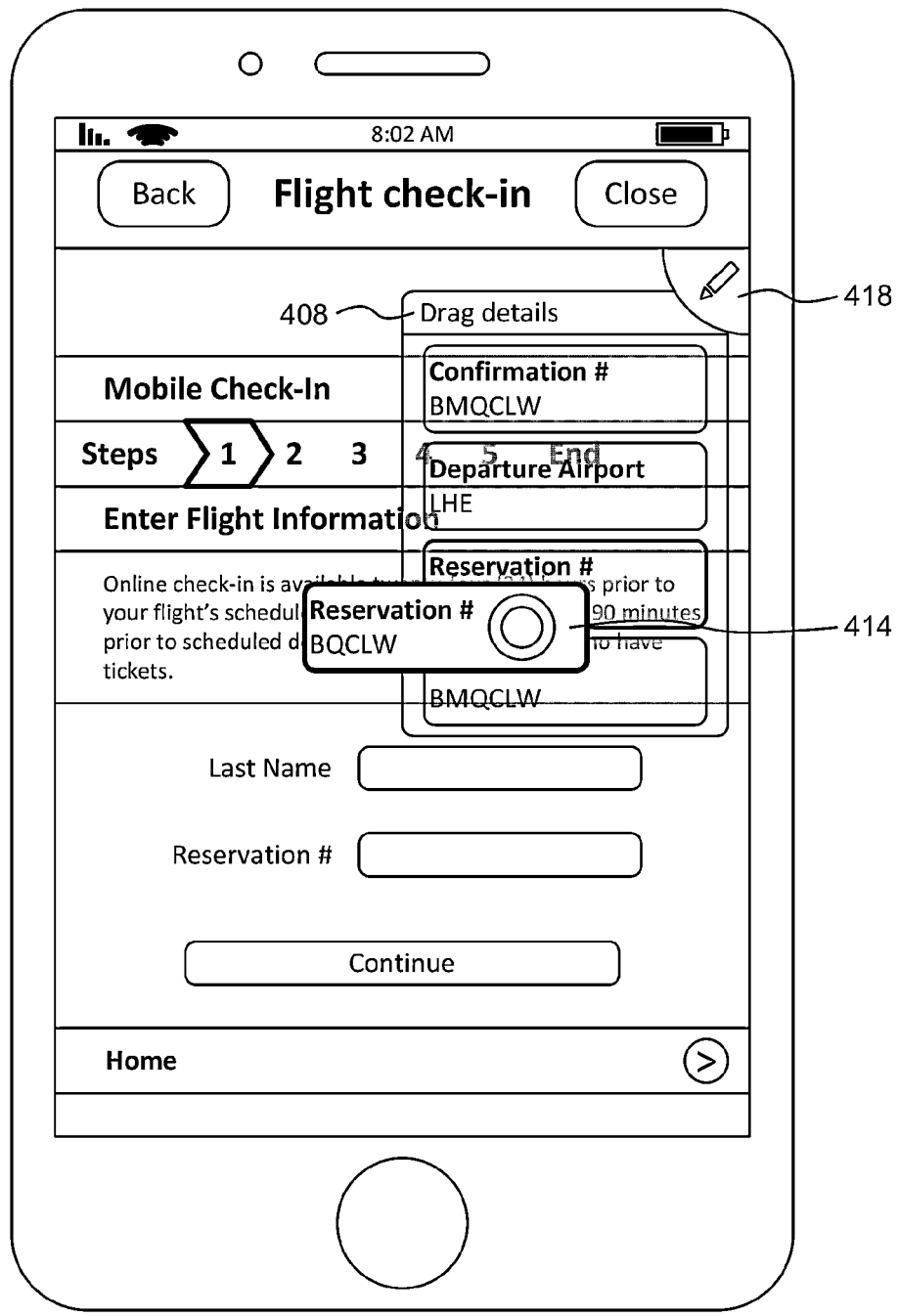

Referring now to FIG. 10, in some embodiments, user interface 400 presents the data elements displayed in contextual user interface element 408 as movable icons. A user may move an icon by dragging the icon from its original location within contextual user interface element 408 to another location within user interface 400 (e.g., inside or outside contextual user interface element 408). In some embodiments, user interface 400 presents contextual user interface element 408 as a variable-transparency window. For example, when an icon is moved out of contextual user interface element 408 (e.g., as shown in FIG. 10), user interface 400 may cause contextual user interface element 408 to appear translucent or transparent. Advantageously, increasing the transparency of contextual user interface element 408 may allow a user to see any text or form fields which may be hidden under contextual user interface element 408.

Figure 11:
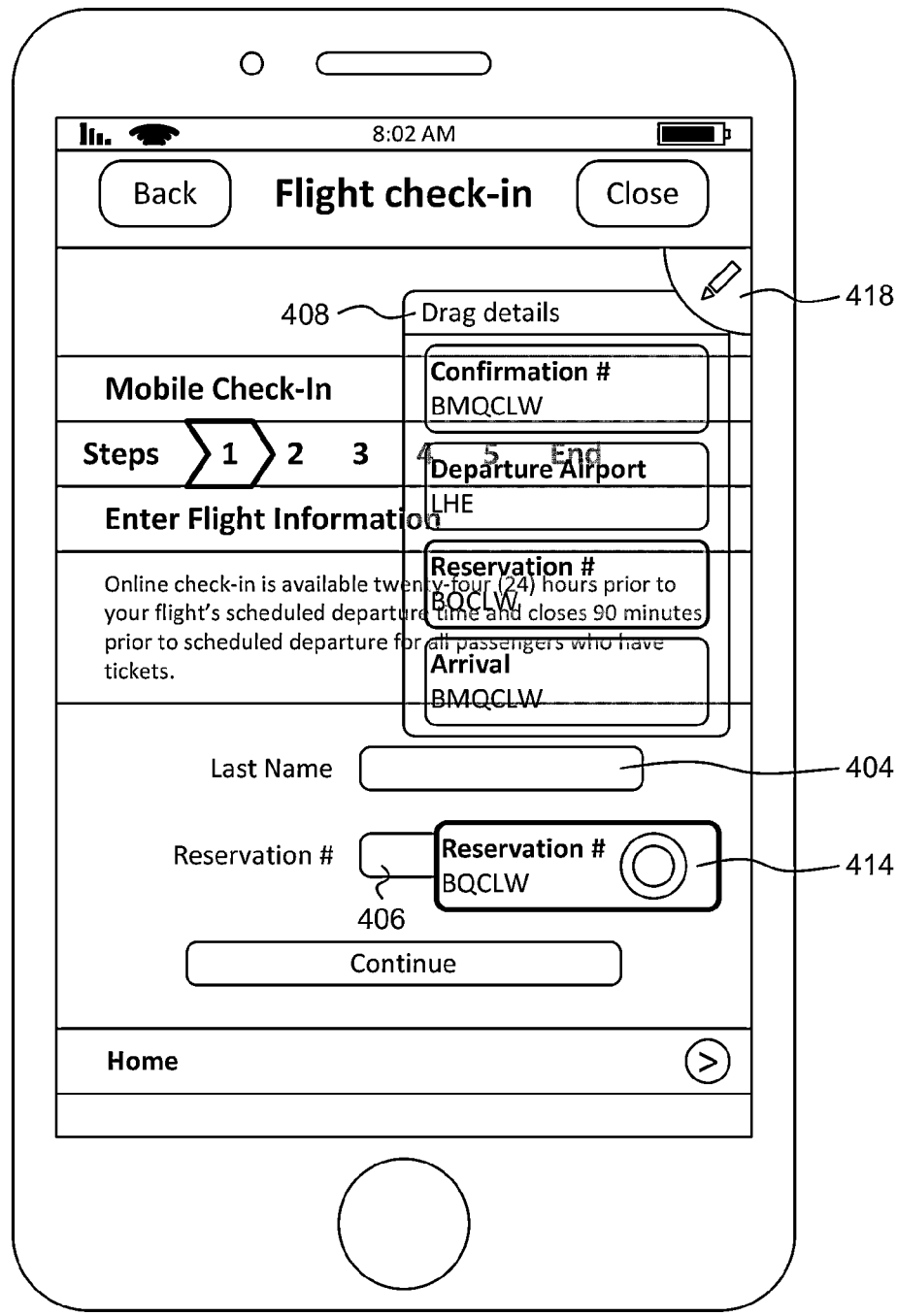
Figure 12:
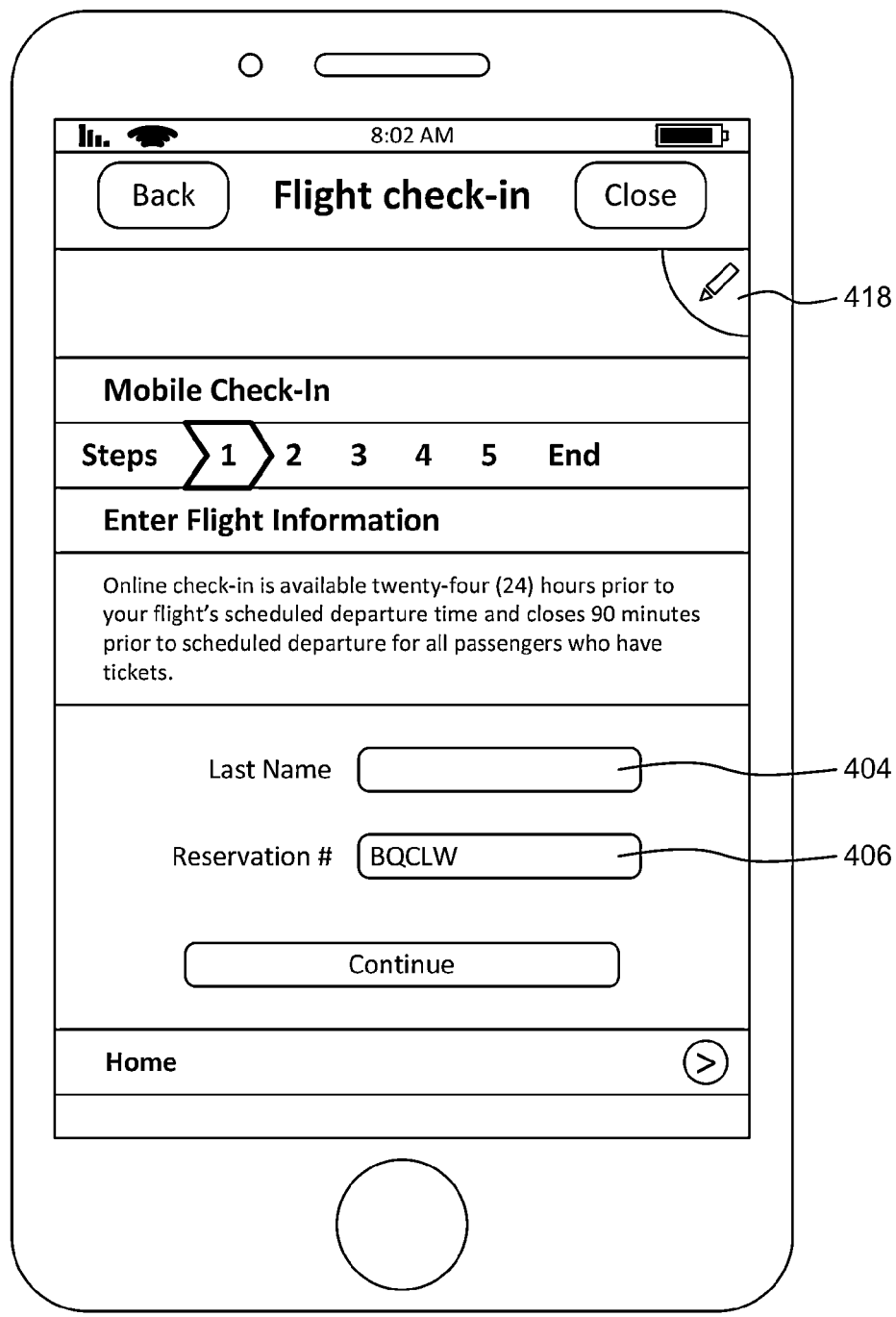

Referring now to FIG. 11, user interface 400 may allow data elements which have been dragged out of contextual user interface element 408 to be dropped into one or more form fields of the web page. For example, data element 414 can be dragged to an area occupied by "Reservation #" form field 406 and dropped into form field 406 (e.g., by releasing a mouse button, removing a finger from a touch screen, etc.). Advantageously, dragging and dropping a data element into a form field may cause the value of the data element to be copied into the form field.

Referring now to FIG. 12, user interface 400 is shown displaying the value of "Reservation #" data element 414 (e.g., "BQCLW") in form field 406. The value of data element 414 may be automatically copied into form field 406 in response to a user dragging and dropping data element 414 into a space occupied by form field 406. This automatic copying may allow a user to quickly and easily complete any required web forms without manually entering the itinerary-specific data.

Figure 13:
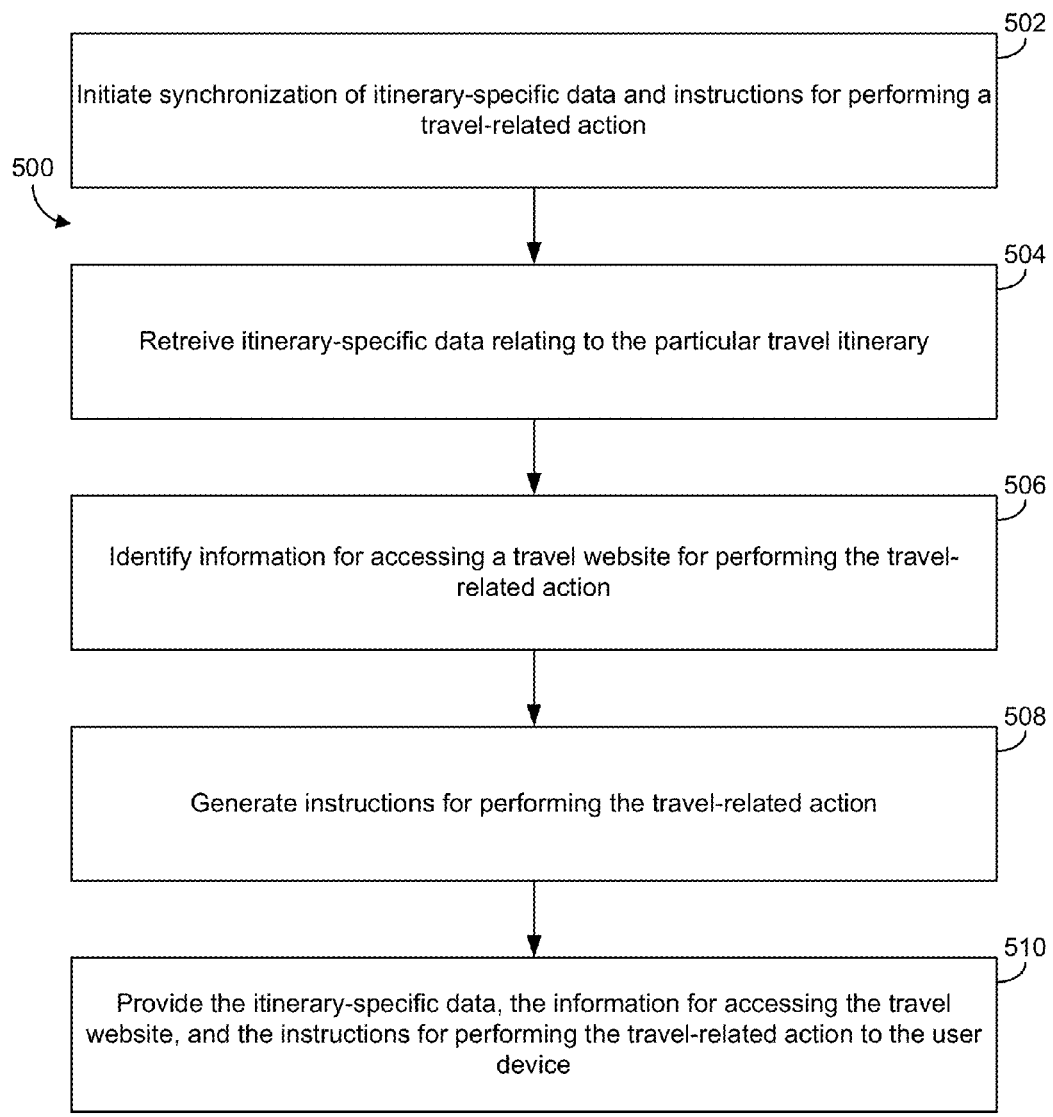
FIG. 13 is a flowchart of a process which may be performed by the remote server of FIG. 4 for facilitating interactions between a user device and a travel website, according to an exemplary embodiment.

Referring now to FIG. 13, a flowchart of a process 500 for synchronizing itinerary-specific data and preparing/synchronizing instructions for performing a travel-related action is shown, according to an exemplary embodiment. Process 500 may be performed by remote server 104 using processing circuit 160 and one or more memory modules contained therein (e.g., memory modules 166-180).

Process 500 is shown to initiating synchronization of itinerary-specific data and instructions for performing a travel-related action (step 502). In some embodiments, the itinerary-specific data relates to a particular travel itinerary. In some implementations, step 502 is performed by data synchronization module 172. Data synchronization module 172 may interact with itinerary management module 168 and site navigation module 170 to identify the itinerary-specific data and determine the information necessary to prepare the instructions. In some embodiments, the travel-related action may be based on the particular travel itinerary. In some embodiments, step 502 includes identifying a travel website through which the travel-related action will be performed. Synchronization may be initiated in response to a change in the itinerary-specific data stored at remote server 104 (e.g., in itinerary database 184).

In some embodiments, step 502 includes determining whether the identified travel website is a supported website for automatically populating form fields. If the travel website is supported, it may be unnecessary to prepare instructions for presenting contextual user interface element 112. However, if the travel website is unsupported, step 502 may include determining that instructions for presenting contextual user interface element 112 should be prepared.

In some embodiments, step 502 includes identifying the information necessary to complete the travel-related action. Travel-related actions may include checking-in for a flight or a hotel, creating new travel arrangements, confirming or changing existing travel arrangements, canceling travel arrangements, or other types of interactions between a user and a travel provider. Data synchronization module 172 may interact with user information module 166, itinerary management module 168, and/or site navigation module 170 to obtain the required information.

Still referring to FIG. 13, process 500 is shown to include retrieving itinerary-specific data relating to the particular travel itinerary (step 504). In some implementations, step 504 may be performed by itinerary management module 168. The itinerary-specific data may be retrieved from an itinerary database (e.g., itinerary database 184). Itinerary-specific data may include data relating to particular travel arrangements. For example, when a user purchases a flight ticket, information relating to the travel arrangement (e.g., flight number, reservation number, departure time, departure location, passenger name, etc.) may provided to itinerary management module 168 and stored in itinerary database 184.

In some embodiments, step 504 includes interacting with travel provider 106 to retrieve detailed information relating to various travel arrangements. In some embodiments, itinerary-specific data includes data relating to both a particular user and a particular travel arrangement. In other words, itinerary-specific data may include user-specific data. In some embodiments, the itinerary-specific data includes all the raw information necessary to perform a travel-related action.

Still referring to FIG. 13, process 500 is shown to include identifying information for accessing a travel website for performing the travel-related action (step 506). In some implementations, step 506 is performed by site navigation module 170. The website for performing the travel-related action may be a website operated by a travel provider through which the travel-related action may be performed.

The information for accessing the travel website may be a URL of a specific webpage of the travel website. The URL may indicate a particular webpage of a travel website for initiating a particular travel-related action. For example, within a travel website operated by an airline, the URL of the webpage for checking-in for a flight may be different than the URL of the webpage for changing a departure time or cancelling a flight reservation. In some embodiments, step 506 includes accessing a list of direct URLs to the specific web pages for performing travel-related actions. The list of direct URLs and the associated travel-related actions may be retrieved from site navigation database 186.

Still referring to FIG. 13, process 500 is shown to include generating instructions for performing the travel-related action (step 508). The instructions may include multiple lines of computer code for automatically navigating the identified travel website and multiple lines of computer code for automatically providing the itinerary-specific data to the travel website. In some implementations, step 508 is performed by navigation instructions module 178 and or itinerary-specific instructions module 176. In some embodiments, step 508 includes interacting with data synchronization module 172 to identify the particular items of itinerary-specific data for which instructions are required.

In some embodiments, the instructions include multiple lines of computer code for populating form fields of the travel website with itinerary-specific data. The itinerary-specific data used to populate the form fields may be data already stored on user device 102 (e.g., in response to a synchronization request) or data communicated to user device 102 along with the requested instructions.

In some embodiments, the instructions include multiple lines of computer code for navigating from a webpage associated with the provided URL to a final webpage for completing the travel-related action. The multiple lines of computer code for automatically navigating the identified travel website may be site-specific instructions relating to a particular travel website. The navigation instructions may include a URL of a webpage for initiating the travel-related action as well as a sequence of steps or actions necessary to complete the travel-related action. For example, a particular travel website may require a user to login at a first webpage, enter a confirmation number at a second webpage, and finally click a confirmation button at a third web page.

In some embodiments, the navigation instructions include multiple lines of computer code for automatically following hyperlinks within the travel website for advancing to another webpage (e.g., the next webpage in the chain of web pages which must be completed/loaded for performing the travel-related action) or submitting the populated data to the travel provider.

In some embodiments, the instructions include a first set of instructions designated for injection into a website file and a second set of instructions designated for an application running on the user device. The first set of instructions may be injected into a website file whereas the second set of instructions may not be injected into the website file. The second set of instructions may provide instructions regarding how the injection should be performed.

Still referring to FIG. 13, process 500 is shown to include providing the itinerary-specific data, the information for accessing the travel website, and the instructions for performing the travel-related action to the user device (step 510). Step 510 may be performed by sending the multiple lines of computer code and travel website URL from remote server 104 to user device 102 (e.g., via communications interface 150). User device 102 may receive the URL and multiple lines of computer code, navigate to the URL, and automatically perform the travel-related action by executing the instructions provided by the computer code.

Figure 14:
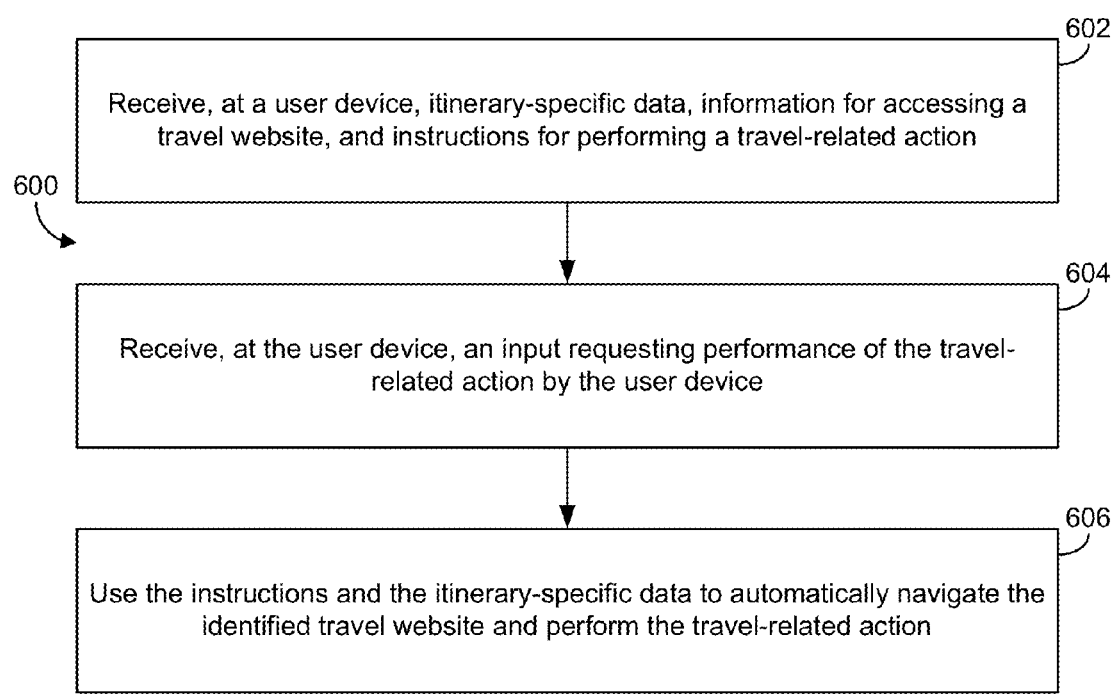
FIG. 14 is a flowchart of a process which may be performed by the user device of FIG. 5 for facilitating interactions between the user device and a travel website, according to an exemplary embodiment.

Referring now to FIG. 14, a flowchart of a process 600 for facilitating interactions between a travel website and a user device is shown, according to an exemplary embodiment. Process 600 may be performed by user device 102 using processing circuit 190 and one or more memory modules contained therein (e.g., memory modules 196-210).

Process 600 is shown to include receiving, at a user device, itinerary-specific data, information for accessing a travel website, and instructions for performing a travel-related action (step 602). In some embodiments, the itinerary-specific data, information for accessing a travel website, and instructions for performing a travel-related action may be received from remote server 104. The information and instructions received in step 602 may be the same or similar to the information and instructions generated by the remote server in steps 504-508 of process 500. For example, itinerary-specific data may include data relating to particular travel arrangements. The information identifying the travel website may be a URL of a specific webpage of the travel website. The URL may indicate a particular webpage of a travel website for initiating a particular travel-related action.

In some embodiments, the instructions for performing the travel-related action include multiple lines of computer code for automatically navigating the identified travel website and multiple lines of computer code for automatically providing itinerary-specific data to the travel website. The multiple lines of computer code for automatically providing itinerary-specific data to the travel website may include computer code for populating form fields of the travel website with itinerary-specific data. The itinerary-specific data used to populate the form fields may be data already stored on user device 102 (e.g., in response to a precious synchronization request) or data communicated to user device 102 along with the requested instructions.

In some embodiments, the instructions for performing the travel-related action include multiple lines of computer code for navigating from a webpage associated with the provided URL to a final webpage for completing the travel-related action. The multiple lines of computer code for automatically navigating the identified travel website may be site-specific instructions relating to a particular travel website. The navigation instructions may include a URL of a webpage for initiating the travel-related action as well as a sequence of steps or actions necessary to complete the travel-related action. In some embodiments, the navigation instructions include multiple lines of computer code for automatically following hyperlinks within the travel website for advancing to another webpage (e.g., the next webpage in the chain of web pages which must be completed/loaded for performing the travel-related action) or submitting the populated data to the travel provider.

In some embodiments, the instructions for performing the travel-related action include a first set of instructions designated for injection into a website file and a second set of instructions designated for an application running on the user device. The first set of instructions may be injected into a website file whereas the second set of instructions may not be injected into the website file. The second set of instructions may provide instructions regarding how the injection should be performed or otherwise used to configure an application running on the user device.

Process 600 is shown to include receiving, at the user device, an input requesting performance of a travel-related action by the user device (step 604). The input may be a user input received via user interface devices 154. In some embodiments, the input requesting performance of a travel-related action may be a user selection of a selectable icon presented via a user interface (e.g., user interface 300). For example, as described with reference to FIG. 6, user interface 300 may include a selectable icon 304.

Selectable icon 304 may be displayed when a travel-related action is available to be performed. For example, online check-in for a particular flight may become available one hour before the flight departure time. User device 102 may receive a notification from remote server 104 or may independently determine that online flight check-in is available when the current time is within the one hour window before the flight departure time. In response to a determination (e.g., by remote server 104 or by user device 102) that a travel-related action is available, selectable icon 304 may be displayed within user interface 300. In some embodiments, the selectable icon includes an indication of the travel-related action (e.g., "Flight check-in") associated with the selectable icon.

Still referring to FIG. 14, process 600 is shown to include using the instructions and the itinerary-specific data to automatically navigate the identified travel website and perform the travel-related action (step 606). In some implementations, step 606 is performed by navigation module 208 and/or form-filling module 210. Step 606 may include automatically navigating from a webpage associated with the provided URL to a final webpage for completing the travel-related action, automatically following hyperlinks within the travel website for advancing to another webpage, and/or automatically submitting itinerary-specific data to the travel provider.

In some embodiments, step 606 includes automatically populating form fields with user-specific and/or itinerary-specific data. The data may be included in the instructions received from remote server 104 previously stored on user device 102 (e.g., by data synchronization module 198). Step 606 may include populating form fields according to literal instructions received from remote server 104 or according to independent form-filling logic (e.g., in place of or in addition to the instructions received from remote server 104). For example, step 606 may include identifying form fields based on the content of the website data (e.g., metadata, HTML data, etc.) and automatically filling identified form fields with itinerary-specific or user-specific data. Step 606 is described in greater detail with reference to FIG. 18.

Figure 15:
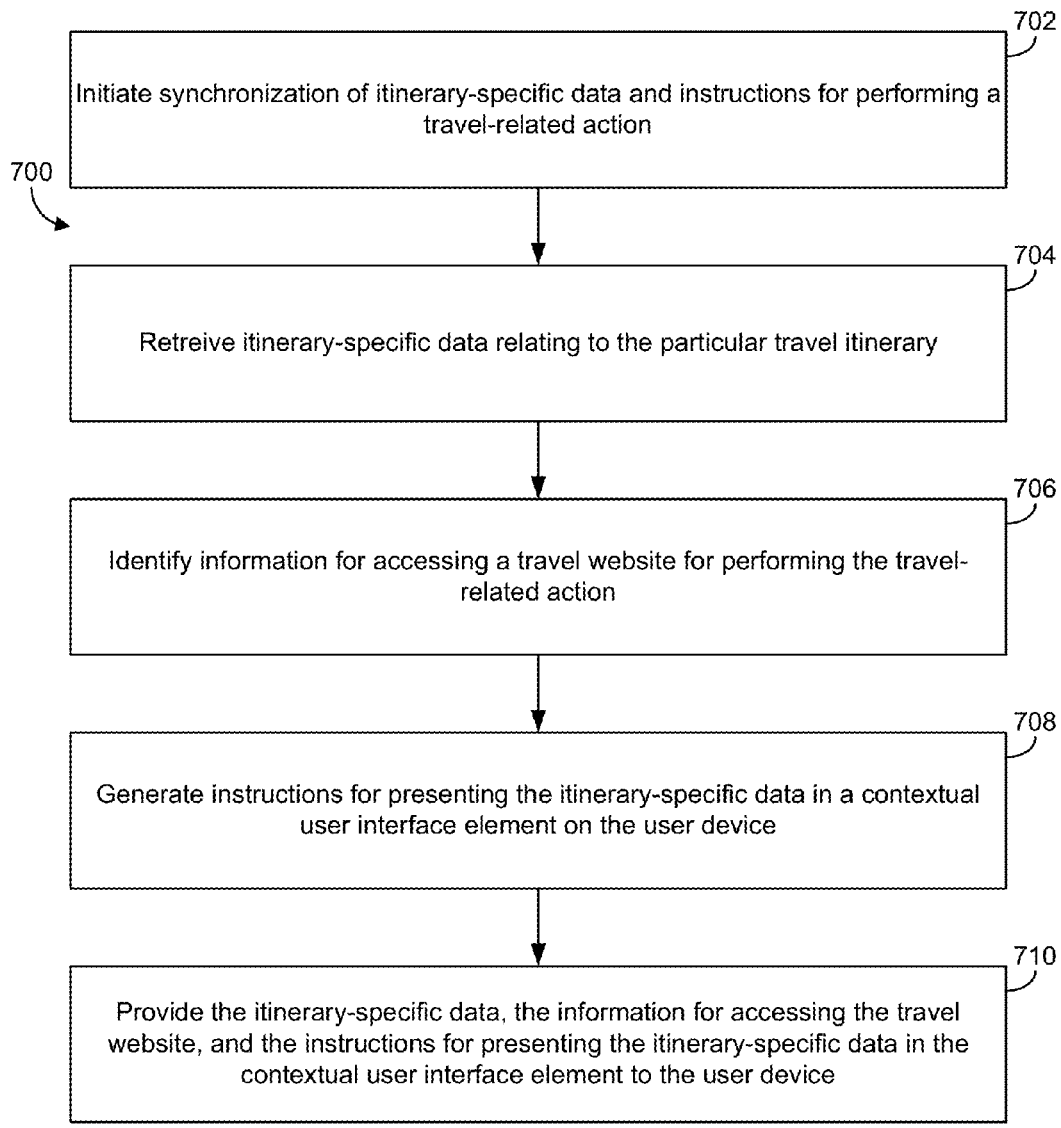
FIG. 15 is a flowchart of a process which may be performed by the remote server of FIG. 4 for generating and causing presentation of the contextual user interface element shown in FIGS. 7-12, according to an exemplary embodiment.

Referring now to FIG. 15, a flowchart of a process 700 for facilitating interactions between a travel website and a user device is shown, according to an exemplary embodiment. Process 700 may be performed by remote server 104 using processing circuit 160 and one or more memory modules contained therein (e.g., memory modules 166-180).

Process 700 is shown to initiating synchronization of itinerary-specific data and instructions for performing a travel-related action (step 702). In some embodiments, the itinerary-specific data relates to a particular travel itinerary. In some implementations, step 702 is performed by data synchronization module 172. Data synchronization module 172 may interact with itinerary management module 168 and site navigation module 170 to identify the itinerary-specific data and determine the information necessary to prepare the instructions. In some embodiments, the travel-related action may be based on the particular travel itinerary. In some embodiments, step 702 includes identifying a travel website through which the travel-related action will be performed. Synchronization may be initiated in response to a change in the itinerary-specific data stored at remote server 104 (e.g., in itinerary database 184).

In some embodiments, step 702 includes determining whether the identified travel website is a supported website for automatically populating form fields. If the travel website is supported, it may be unnecessary to prepare instructions for presenting contextual user interface element 112. However, if the travel website is unsupported, step 702 may include determining that instructions for presenting contextual user interface element 112 should be prepared.

In some embodiments, step 702 includes identifying the information necessary to complete the travel-related action. Travel-related actions may include checking-in for a flight or a hotel, creating new travel arrangements, confirming or changing existing travel arrangements, canceling travel arrangements, or other types of interactions between a user and a travel provider. Data synchronization module 172 may interact with user information module 166, itinerary management module 168, and/or site navigation module 170 to obtain the required information.

Still referring to FIG. 15, process 700 is shown to include retrieving itinerary-specific data relating to the particular travel itinerary (step 704). In some implementations, step 704 may be performed by itinerary management module 168. The itinerary-specific data may be retrieved from an itinerary database (e.g., itinerary database 184). Itinerary-specific data may include data relating to particular travel arrangements. For example, when a user purchases a flight ticket, information relating to the travel arrangement (e.g., flight number, reservation number, departure time, departure location, passenger name, etc.) may provided to itinerary management module 168 and stored in itinerary database 184.

In some embodiments, step 704 includes interacting with travel provider 106 to retrieve detailed information relating to various travel arrangements. In some embodiments, itinerary-specific data includes data relating to both a particular user and a particular travel arrangement. In other words, itinerary-specific data may include user-specific data. In some embodiments, the itinerary-specific data includes all the raw information necessary to perform a travel-related action.

Still referring to FIG. 15, process 700 is shown to include identifying information for accessing a travel website for performing the travel-related action (step 706). In some implementations, step 506 is performed by site navigation module 170. The website for performing the travel-related action may be a website operated by a travel provider through which the travel-related action may be performed.

The information for accessing the travel website may be a URL of a specific webpage of the travel website. The URL may indicate a particular webpage of a travel website for initiating a particular travel-related action. For example, within a travel website operated by an airline, the URL of the webpage for checking-in for a flight may be different than the URL of the webpage for changing a departure time or cancelling a flight reservation. In some embodiments, step 706 includes accessing a list of direct URLs to the specific web pages for performing travel-related actions. The list of direct URLs and the associated travel-related actions may be retrieved from site navigation database 186.

Still referring to FIG. 15, process 700 is shown to include generating instructions for presenting the itinerary-specific data in a contextual user interface element on the user device (step 708). In some implementations, step 708 is performed by contextual user interface element instructions module 180. Instructions for presenting the itinerary-specific data in a contextual user interface element may include instructions for selecting particular data elements to include in contextual user interface element 112. In some embodiments, the instructions include selection logic based on the content of the webpage displayed (e.g., HTML content, XML content, metadata content, etc.). In other embodiments, the instructions may include instructions to present specific data elements when a particular webpage is displayed.

In some embodiments, step 708 includes generating instructions for inserting data from contextual user interface element 112 into an identified form field of the travel website. For example, a user may drag and drop data elements from contextual user interface element 112 into form fields of the travel website. Step 708 may include generating instructions specifying that when a data element is dragged from contextual user interface element 112 into a space occupied by a form field, the value of the data element should be automatically inserted into the form field.

Still referring to FIG. 15, process 700 is shown to include providing the itinerary-specific data, the information for accessing the travel website, and the instructions for presenting the itinerary-specific data in the contextual user interface element to the user device (step 710). Step 710 may be performed by sending the instructions for presenting the itinerary-specific data and travel website URL from remote server 104 to user device 102 (e.g., via communications interface 150). User device 102 may receive the URL and instructions, navigate to the URL, and present one or more of the itinerary-specific data in the contextual user interface element according to the instructions.

Figure 16:
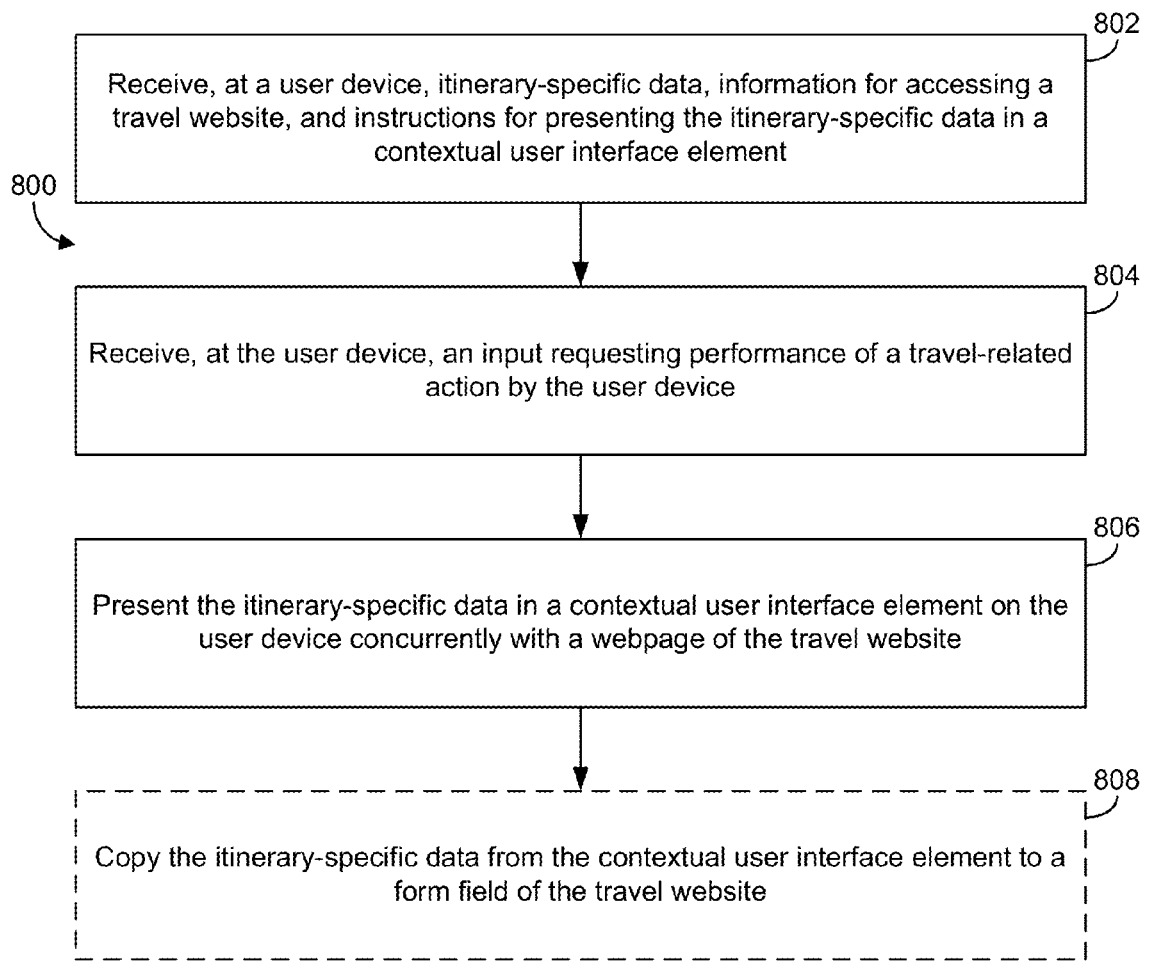
FIG. 16 is a flowchart of a process which may be performed by the user device of FIG. 5 for presenting the contextual user interface element shown in FIGS. 7-12, according to an exemplary embodiment.

Referring now to FIG. 16, a flowchart of a process 800 for facilitating interactions between a travel website and a user device is shown, according to an exemplary embodiment. Process 800 may be performed by user device 102 using processing circuit 190 and one or more memory modules contained therein (e.g., memory modules 196-210).

Process 800 is shown to include receiving, at a user device, itinerary-specific data, information for accessing a travel website, and instructions for presenting the itinerary-specific data in a user interface element (step 802). In some embodiments, the itinerary-specific data, information for accessing a travel website, and instructions for performing a travel-related action may be received from remote server 104. The information and instructions received in step 802 may be the same or similar to the information and instructions generated by the remote server in steps 704-708 of process 700. For example, itinerary-specific data may include data relating to particular travel arrangements. The information identifying the travel website may be a URL of a specific webpage of the travel website. The URL may indicate a particular webpage of a travel website for initiating a particular travel-related action.

Instructions for presenting the itinerary-specific data in a contextual user interface element may include multiple lines of computer code for selecting particular data elements to include in contextual user interface element 112. In some embodiments, the instructions include selection logic based on the content of the webpage displayed (e.g., HTML content, XML content, metadata content, etc.). In other embodiments, the instructions may include instructions to present specific data elements when a particular webpage is displayed.

In some embodiments, the instructions for presenting the itinerary-specific data in a contextual user interface element include multiple lines of computer code for inserting data from contextual user interface element 112 into an identified form field of the travel website. For example, a user may drag and drop data elements from contextual user interface element 112 into form fields of the travel website. In some embodiments, the instructions for presenting the itinerary-specific data in a contextual user interface element include multiple lines of computer code specifying that when a data element is dragged from contextual user interface element 112 into a space occupied by a form field, the value of the data element should be automatically inserted into the form field.

Still referring to FIG. 16, process 800 is shown to include receiving, at the user device, an input requesting performance of a travel-related action by the user device (step 804). The input may be a user input received via user interface devices 154. In some embodiments, the input requesting performance of a travel-related action may be a user selection of a selectable icon presented via a user interface (e.g., user interface 300). For example, as described with reference to FIG. 6, user interface 300 may include a selectable icon 304.

Selectable icon 304 may be displayed when a travel-related action is available to be performed. For example, online check-in for a particular flight may become available one hour before the flight departure time. User device 102 may receive a notification from remote server 104 or may independently determine that online flight check-in is available when the current time is within the one hour window before the flight departure time. In response to a determination (e.g., by remote server 104 or by user device 102) that a travel-related action is available, selectable icon 304 may be displayed within user interface 300. In some embodiments, the selectable icon includes an indication of the travel-related action (e.g., "Flight check-in") associated with the selectable icon.

Still referring to FIG. 16, process 800 is shown to include presenting the itinerary-specific data in a contextual user interface element on the user device concurrently with a webpage of the travel website (step 806). In some implementations, step 806 may be performed by contextual user interface element module 206. Advantageously, presenting itinerary-specific data in a contextual user interface element may facilitate application of such data to form fields in the travel website when automatic population is unavailable (e.g., for unsupported or recently-changed websites). Itinerary-specific data may be presented in the contextual user interface element as selectable and/or movable icons.

In some embodiments, step 806 includes presenting data elements relevant to a particular web page. Step 806 may include determining which data elements are relevant to a particular web page based on the content of the web page data (e.g., HTML data, XML data, form field names, etc.). As user device 102 navigates from page to page (e.g., automatically or in response to a user input), step 806 may include adjusting the data elements displayed in the contextual user interface element.

In some embodiments, step 806 includes executing instructions generated by remote server 104 (e.g., by contextual user interface element instructions module 180) for presenting contextual user interface element 112. Instructions for presenting contextual user interface element 112 may include instructions for selecting particular data elements to include in contextual user interface element 112. In some embodiments, the instructions include selection logic based on the content of the webpage displayed. In other embodiments, the instructions specify particular data elements to present when a particular webpage is displayed.

Still referring to FIG. 16, in some embodiments, process 800 further includes copying the itinerary-specific data from the contextual user interface element to a form field of the travel website (step 808). Step 808 may include executing additional instructions to insert data from contextual user interface element 112 into a form field of the travel website. For example, as previously described, a user may drag and drop data elements from contextual user interface element 112 into form fields of the travel website. Step 808 may be performed in response to a user dropping a data element into a space occupied by a form field. Executing the additional instructions may cause user device 102 to automatically insert the value of the data element into the form field.

Figure 17:
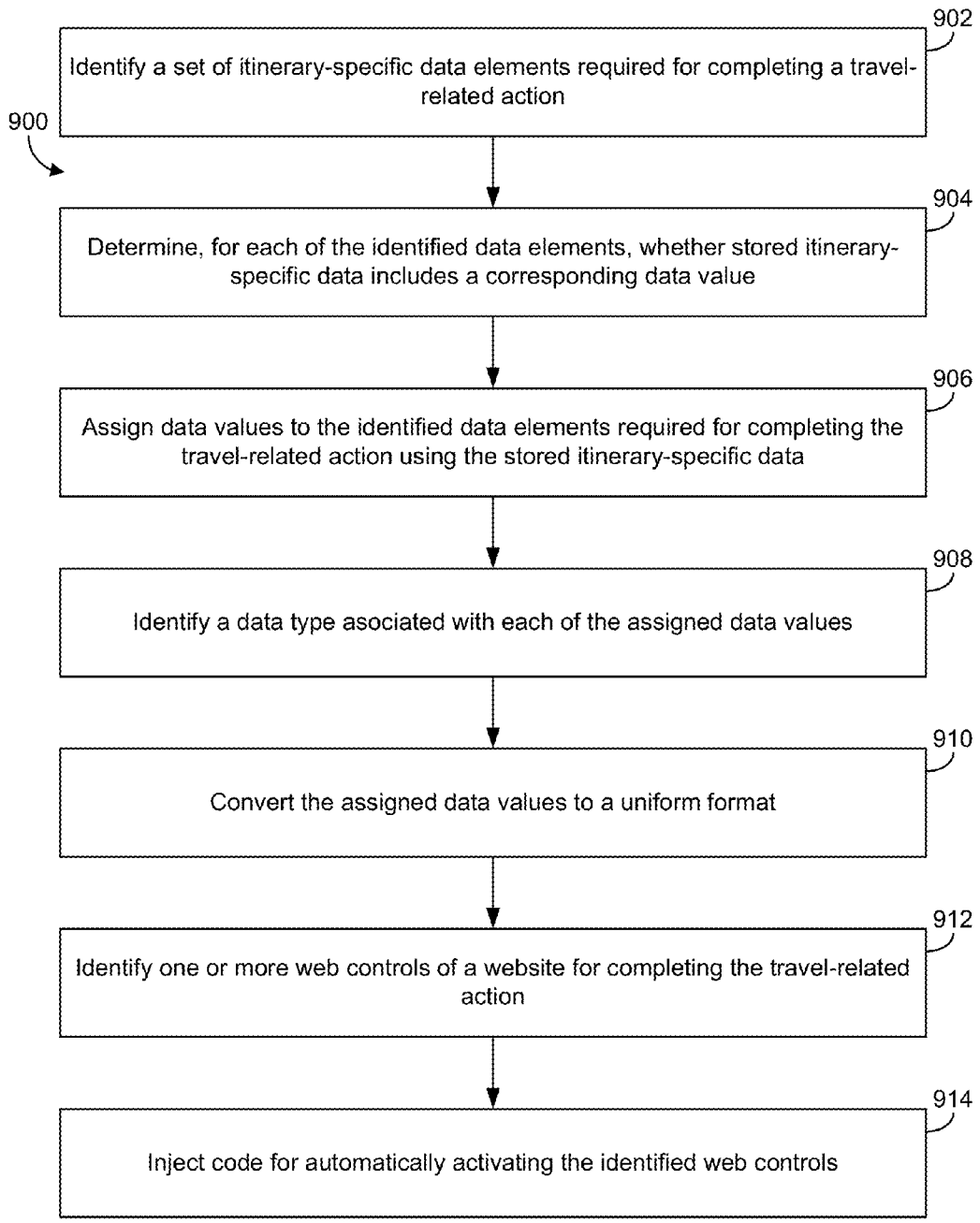
FIG. 17 is a flowchart of a process for identifying and assigning data values for a set of itinerary-specific data elements required for completing a travel-related action, according to an exemplary embodiment.

Referring now to FIG. 17, a flowchart of a process 900 for facilitating interactions between a user device and a plurality of different travel websites is shown, according to an exemplary embodiment. Process 900 may be performed by user device 102 using processing circuit 190 and one or more memory modules contained therein (e.g., memory modules 196-210). In some implementations, process 900 may be controlled by the instructions received by user device 102 (e.g., from remote server 104) for completing a travel-related action.

Process 900 is shown to include identifying a set of itinerary-specific data elements required for completing a travel-related action (step 902). Typically, the itinerary-specific data elements required for completing a travel-related action may depend on a variety of factors. For example, the information required for checking-in for a flight may be different than the information required for cancelling a hotel reservation. Additionally, different travel providers and travel websites may require different information from users for completing similar travel-related actions. Advantageously, step 902 may be performed to identify the particular itinerary-specific data elements required for performing a particular travel-related action at a particular travel website.

In some embodiments, step 902 includes receiving a list of itinerary-specific data elements required for completing the travel-related action from remote server 104. Alternatively, itinerary-specific data elements may be identified by user device 102 based on the content of the travel website for performing the travel related action, the type of travel-related action, or any other relevant identification criteria.

Still referring to FIG. 17, process 900 is shown to include determining, for each of the identified data elements, whether stored itinerary-specific data includes a corresponding data value (step 904). Step 904 may include loading itinerary-specific data from a local memory of user device 102 and determining whether the data includes data values for each of the data elements required for completing the travel-related action. The itinerary-specific data may have been received by user device 102 during a prior synchronization with remote server 104 (e.g., as described with reference to FIG. 13).

Process 900 is shown to further include assigning data values to the identified data elements required for completing the travel-related action using the stored itinerary-specific data (step 906). Step 906 may include extracting a data value from the stored itinerary-specific data for each of the identified data elements and assigning the extracted data value to the corresponding itinerary-specific data elements. For example, a stored value for a flight reservation number may be assigned to a "Flight Reservation #" data element. In some embodiments, step 906 may include obtaining any missing data values from remote server 104 (e.g., by re-synchronizing the itinerary-specific data, by querying remote server 104 for supplemental data, etc.).

Still referring to FIG. 17, process 900 is shown to include identifying a data type associated with each of the assigned data values (step 908) and converting the assigned data values to a uniform format (step 910). Values for the itinerary-specific data elements may exist in a variety of data types (e.g., different formats, different encoding, different language, etc.). The variety of disparate data types may result from itinerary-specific data being gathered from many different travel providers. Advantageously, steps 908 and 910 can be performed to harmonize the data from many different travel providers by converting the data to a single, easily comprehensible format, thereby facilitating interactions between user device 102 and the many different travel providers.

Process 900 is shown to include identifying one or more web controls of a website for completing the travel-related action (step 912). Web controls may be elements of a website which allow for interaction with the website. For example, web controls may include text controls for entering text into a form field of the website, selection controls for selecting a particular element of the website (e.g., in a dropdown box, as a selectable icon, etc.), navigation controls for navigating through multiple pages of the website (e.g., via embedded hyperlinks), or any other controls through which a website can receive a user interaction.

Step 912 may include identifying web controls of the travel website which may be used to complete the travel-related action. For example, step 912 may include identifying text controls for entering itinerary-specific data into an empty form field of a travel website, identifying navigation controls for advancing to another webpage of the travel website once the itinerary-specific data has been entered, and/or identifying any other controls which would normally be operated/manipulated by a user (e.g., by manually entering text, manually clicking a link, etc.) when performing the travel-related action.

Still referring to FIG. 17, process 900 is shown to include injecting code for automatically activating the identified web controls (step 914). In some embodiments, step 914 includes injecting code into a website file which has been downloaded from the travel website and loaded by a web browser running on a mobile device. The code may include multiple lines of computer code for performing the travel-related action.

Advantageously, the code may include executable instructions (e.g., JavaScript® instructions) for automatically activating one or more of the identified web controls. For example, the injected code may include instructions for automatically entering a data value into a form field of the travel website, instructions for automatically advancing to another page of the travel website, and/or code for automatically performing any type of action/interaction which would normally be performed by a user. The code may mimic manual actions such as pressing a button, selecting a value from a dropdown list, entering text, or any other action which would typically be performed by a user to complete the travel-related action.

Figure 18:
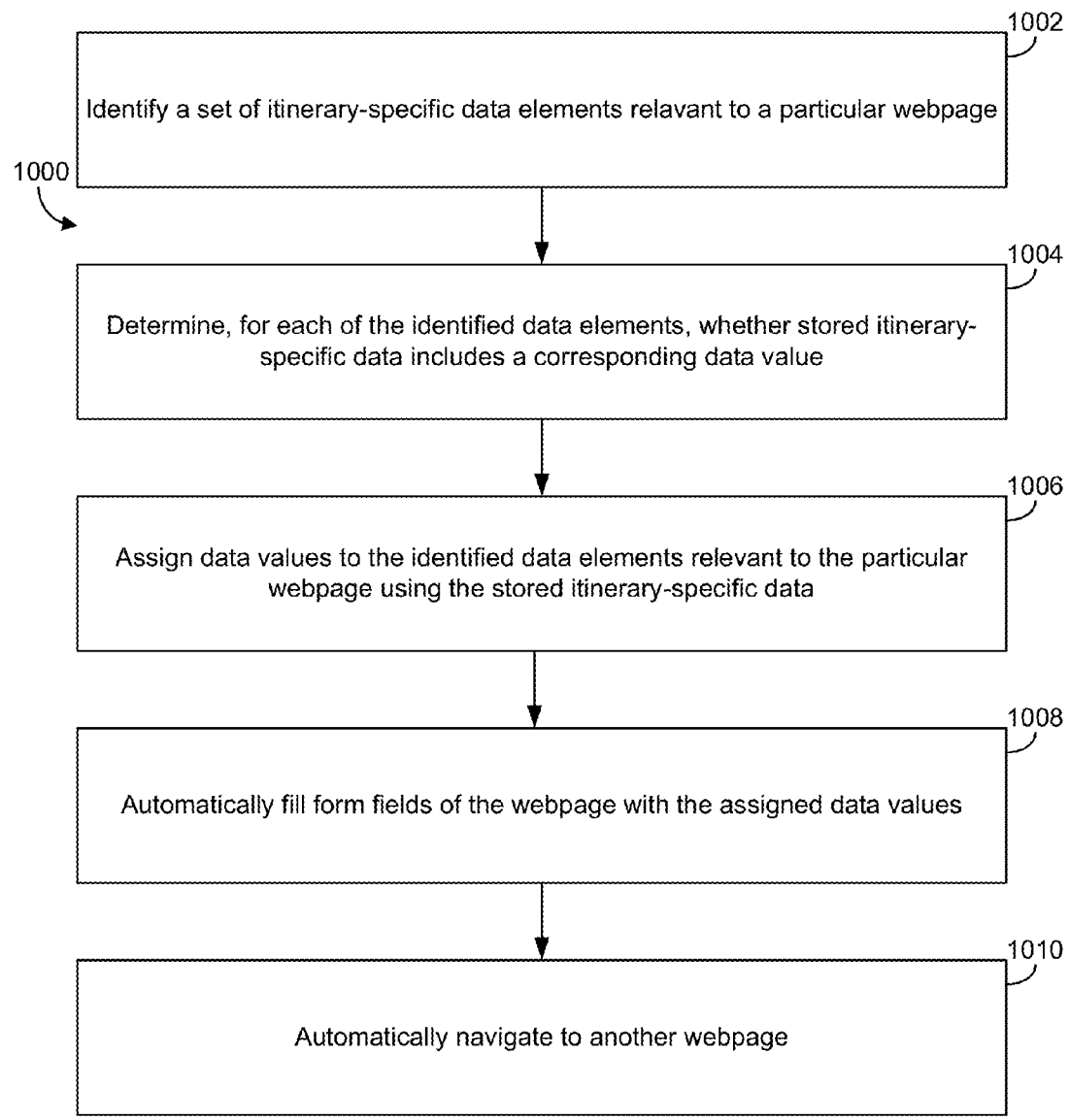
FIG. 18 is a flowchart of a process for automatically filling form fields of a travel website with itinerary-specific data and automatically navigating through a travel website to complete a travel-related action, according to an exemplary embodiment.

Referring now to FIG. 18, a flowchart of a process 1000 for automatically performing travel-related actions is shown, according to an exemplary embodiment. Process 1000 may be performed by user device 102 using processing circuit 190 and one or more memory modules contained therein (e.g., memory modules 196-210). In some implementations, process 1000 may be controlled by the instructions received by user device 102 (e.g., from remote server 104) for completing a travel-related action.

Process 1000 is shown to include identifying a set of itinerary-specific data elements relevant to a particular webpage (step 1002). The itinerary-specific data elements relevant to a particular webpage may be based on the information required to be entered into the webpage (e.g., in form fields). The information required by a webpage depend on a variety of factors. For example, different travel providers and travel websites may require different information from users for completing the same travel-related action. Additionally, the information required by a webpage may depend on the type of travel-related action which can be performed through the webpage. Furthermore, a single travel-related action may require information to be entered into multiple web pages. Step 1002 may be performed to identify the particular itinerary-specific data elements required by a particular webpage for performing a particular travel-related action at a particular travel website.

Still referring to FIG. 18, process 1000 is shown to include determining, for each of the identified data elements, whether stored itinerary-specific data includes a corresponding data value (step 1004). Step 1004 may include loading itinerary-specific data from a local memory of user device 102 and determining whether the data includes data values for each of the data elements required for completing the travel-related action. The itinerary-specific data may have been received by user device 102 during a prior synchronization with remote server 104 (e.g., as described with reference to FIG. 13).

Process 1000 is shown to further include assigning data values to the identified data elements relevant to the particular webpage using the stored itinerary-specific data (step 1006). Step 1006 may include extracting a data value from the stored itinerary-specific data for each of the identified data elements and assigning the extracted data value to the corresponding itinerary-specific data elements. For example, a stored value for a flight departure time may be assigned to a "Flight Departure Time" data element. In some embodiments, step 1006 may include obtaining any missing data values from remote server 104 (e.g., by re-synchronizing the itinerary-specific data, by querying remote server 104 for supplemental data, etc.).

Still referring to FIG. 18, process 1000 is shown to include automatically filling form fields of the webpage with the assigned data values (step 1008). In some embodiments, step 1008 includes automatically populating form fields with user-specific and/or itinerary-specific data. Step 1008 may include populating form fields according to literal instructions received from remote server 104 or according to independent form-filling logic (e.g., in place of or in addition to the instructions received from remote server 104). For example, step 1008 may include identifying form fields based on the content of the website data (e.g., metadata, HTML data, etc.) and automatically filling identified form fields with itinerary-specific or user-specific data. Advantageously, step 1008 may allow itinerary-specific data to be provided to a travel website without requiring a user to manually enter the data.

Process 1000 is shown to further include automatically navigating to another webpage (step 1010). In some implementations, step 1010 is performed by navigation module 208 and/or form-filling module 210. Step 1010 may include automatically navigating through multiple web pages required for completing a travel-related action. For example, step 1010 may include executing JavaScript® instructions for automatically advancing to another webpage, automatically following hyperlinks within the travel website, and/or automatically submitting itinerary-specific data to the travel provider. In some embodiments, step 1010 is performed when all required data elements (e.g., as identified in step 1002) are entered into a particular webpage. Advantageously, the combination of steps 1008 and 1010 may facilitate automated form filling and navigation through a travel website (e.g., without requiring user input).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for facilitating interactions between a travel website and a user device, the system comprising:
   the user device comprising a processor configured to:
   send a request for instructions for performing a travel-related action to a remote server;
   receive, from the remote server in response to the request for instructions, itinerary-specific data relating to a particular travel itinerary and information for accessing a travel website for performing the travel-related action, the information from the remote server comprising a URL identifying a particular web page of the travel website through which the travel-related action can be performed;
   use the information for accessing the travel website to navigate to the identified webpage of the travel website after sending the request for instructions and after receiving the itinerary-specific data and the information for accessing the travel website from the remote server;
   present the itinerary-specific data from the remote server in a contextual user interface element on the user device concurrently with the webpage of the travel website for performing the travel-related action, wherein the itinerary-specific data are presented as selectable data elements within the contextual user interface element;
   determine which of a plurality of itinerary-specific data elements to present in the contextual user interface element by identifying one or more of the itinerary-specific data elements that contain itinerary-specific data designated for form fields in the web page of the travel website, wherein the identified itinerary-specific data elements are presented in the contextual user interface element as the selectable data elements;
   receive a user selection of at least one of the selectable data elements; and
   execute instructions for copying the itinerary-specific data from the contextual user interface element to the form fields in the web page of the travel website in response to the user selection.

2. The system of claim 1, wherein the processor is configured to receive a user input requesting performance of the travel-related action by the processor;
   wherein the request for instructions for performing the travel-related action includes an indication of the particular travel itinerary.

3. The system of claim 1, wherein the processor is configured to receive instructions for presenting the itinerary-specific data in the contextual user interface element from the remote server;
   wherein the itinerary-specific data are presented in the contextual user interface element according to the instructions received from the remote server.

4. The system of claim 1, wherein the processor is configured to present the webpage of the travel website using a web browser embedded in an application running on the user device;
   wherein the processor is configured to generate the contextual user interface element and present the contextual user interface element concurrently with the webpage of the travel website.

5. The system of claim 4, wherein the user device is a mobile device and the application is a mobile application running on the mobile device.

6. The system of claim 1, wherein the processor is configured to determine which of the plurality of itinerary-specific data elements to present in the contextual user interface element based on content of the web page presented concurrently with the contextual user interface element.

7. The system of claim 1, wherein the processor is configured to: load a first webpage of the travel website in a web browser running on the user device;
   present a subset of the itinerary-specific data in the contextual user interface element concurrently with the first webpage;
   navigate from the first webpage of the travel website to a second webpage of the travel website using the web browser;
   adjust the subset of itinerary-specific data elements presented in the contextual user interface element in response to navigating from the first webpage to the second webpage; and
   present the adjusted subset of itinerary-specific data elements in the contextual user interface element concurrently with the second webpage.

8. The system of claim 7, wherein the processor is further configured to:
   select one or more of a plurality of itinerary-specific data elements for inclusion in the subset of itinerary-specific data presented concurrently with the first webpage based on content of the first webpage; and
   select one or more of the plurality of itinerary-specific data elements for inclusion in the adjusted subset of itinerary-specific data presented concurrently with the second webpage based on content of the second webpage.

9. The system of claim 1, further comprising:
   a remote server configured to generate instructions for presenting the itinerary-specific data in the contextual user interface element and provide the instructions to the processor;
   wherein the itinerary-specific data are presented in the contextual user interface element by the processor according to the instructions received from the remote server.

10. The system of claim 9, wherein the instructions for presenting the itinerary-specific data in the contextual user interface element on the user device include instructions for determining which of a plurality of itinerary-specific data elements to present in the contextual user interface element.

11. The system of claim 1, wherein the instructions are scripting language instructions.

12. A method for facilitating interactions between a travel website and a user device, the method comprising:
   initiating, at a remote server, synchronization of itinerary-specific data and instructions for performing a travel-related action with the user device;
   retrieving, by the remote server, itinerary-specific data relating to a particular travel itinerary from an itinerary database;
   identifying, by the remote server, information for accessing a travel website for performing the travel-related action, the information comprising a URL identifying a particular web page of the travel website through which the travel-related action can be performed;

generating, by the remote server, instructions for presenting the itinerary-specific data in a contextual user interface element on the user device, the instructions including instructions for presenting the contextual user interface element concurrently with the webpage of the travel website for performing the travel-related action;

determining which of a plurality of itinerary-specific data elements to present in the contextual user interface element by identifying one or more of the itinerary-specific data elements that contain itinerary-specific data designated for form fields in the web page of the travel website, wherein the instructions for presenting the itinerary-specific data comprise instructions for presenting the identified itinerary-specific data elements in the contextual user interface element; and providing the instructions for performing the travel-related action from the remote server to the user device, the instructions for performing the travel-related action comprising the itinerary-specific data, the information for accessing the travel website, and the instructions for presenting the itinerary-specific data in the contextual user interface element;

wherein the instructions for performing the travel-related action cause the user device to navigate to the identified webpage of the travel website after receiving the instructions for performing the travel-related action from the remote server.

13. The method of claim 12, wherein the instructions for presenting the itinerary-specific data in the contextual user interface element on the user device include instructions for copying the itinerary-specific data from the contextual user interface element to the form fields in the web page of the travel website.

14. The method of claim 12, wherein the instructions for presenting the itinerary-specific data in the contextual user interface element on the user device include instructions for presenting the itinerary-specific data as selectable data elements in the contextual user interface element;

wherein the instructions for presenting the itinerary-specific data in the contextual user interface element further include instructions for copying the itinerary-specific data from the contextual user interface element to the form fields in the web page of the travel website in response to a user selection of a selectable data element.

15. The method of claim 12, wherein the instructions for presenting the itinerary-specific data in the contextual user interface element on the user device include instructions for determining which of the plurality of itinerary-specific data elements to present in the contextual user interface element.

16. The method of claim 15, wherein the instructions for determining which of the plurality of itinerary-specific data elements to present in the contextual user interface element include logic for determining which of the plurality of itinerary-specific data elements to present in the contextual user interface element based on content of a webpage presented concurrently with the contextual user interface element.

17. The method of claim 12, wherein the instructions are scripting language instructions.

18. A method for facilitating interactions between a travel website and a user device, the method comprising:

receiving, at the user device from a remote server, instructions for performing a travel-related action, the instructions for performing the travel-related action comprising itinerary-specific data relating to a particular travel itinerary, information for accessing a travel website for performing the travel-related action, and instructions for presenting the itinerary-specific data in a contextual user interface element, wherein the information for accessing the travel website comprises a URL identifying a particular web page of the travel website through which the travel-related action can be performed;

receiving, via a user interface element of the user device, an input requesting performance of a travel-related action by the user device;

using the information for accessing the travel website to load the identified webpage of the travel website in a web browser running on the user device after receiving the instructions for performing the travel-related action from the remote server;

determining which of a plurality of itinerary-specific data elements to present in a contextual user interface element by identifying one or more of the itinerary-specific data elements that contain itinerary-specific data designated for form fields in the web page of the travel website; and presenting the identified itinerary-specific data elements in the contextual user interface element on the user device, wherein the contextual user interface element is presented concurrently with the webpage of the travel website for performing the travel-related action.

19. The method of claim 18, further comprising:

copying the itinerary-specific data from the contextual user interface element to the form fields in the web page of the travel website for performing the travel-related action.

20. The method of claim 19, wherein the itinerary-specific data are presented as selectable data elements within the contextual user interface element, the method further comprising:

receiving a user selection of at least one of the selectable data elements;

wherein the itinerary-specific data are copied from the contextual user interface element to the form fields in the web page of the travel website in response to the user selection.

21. The method of claim 19, wherein the itinerary-specific data are presented as movable icons within the contextual user interface element, the method further comprising:

receiving a user input moving at least one of the movable icons into a space occupied by the form fields in the web page of the travel website;

wherein the itinerary-specific data are copied from the contextual user interface element to the form field of the travel website in response to the user input.

22. The method of claim 18, wherein the contextual user interface element is presented as a variable-transparency user interface element and the itinerary-specific data are presented as movable icons within the variable-transparency user interface element, the method further comprising:

adjusting a transparency of the contextual user interface element in response to a user input moving at least one of the movable icons out of the contextual user interface element.

23. The method of claim 18, further comprising:

determining which of the plurality of itinerary-specific data elements to present in the contextual user interface element based on content of the webpage presented concurrently with the contextual user interface element.

24. The method of claim 18, further comprising:
loading a first webpage of the travel website for performing the travel-related action in the web browser running on the user device;
presenting a subset of the itinerary-specific data in the contextual user interface element concurrently with the first webpage;
navigating from the first webpage of the travel website to a second webpage of the travel website;
adjusting the subset of itinerary-specific data elements presented in the contextual user interface element in response to navigating from the first webpage to the second webpage; and
presenting the adjusted subset of itinerary-specific data elements in the contextual user interface element concurrently with the second webpage.

25. The method of claim 24, further comprising:
selecting one or more of a plurality of itinerary-specific data elements for inclusion in the subset of itinerary-specific data presented concurrently with the first webpage based on content of the first webpage; and
selecting one or more of the plurality of itinerary-specific data elements for inclusion in the adjusted subset of itinerary-specific data presented concurrently with the second webpage based on content of the second webpage.

* * * * *